United States Patent
Zeng et al.

(10) Patent No.: US 11,748,647 B1
(45) Date of Patent: Sep. 5, 2023

(54) DIRECTED CONTENT RECOMMENDATIONS FOR A SEQUENCE OF MULTIPLE PAGES

(71) Applicant: Amazon Technologies, Inc., Seattle, WA (US)

(72) Inventors: Wenjun Zeng, Shoreline, WA (US); Yi Liu, Seattle, WA (US); Zachary Wake Austin, Seattle, WA (US); Hau Wing Calvin Kwok, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 554 days.

(21) Appl. No.: 16/708,341

(22) Filed: Dec. 9, 2019

(51) Int. Cl.
*G06F 16/958* (2019.01)
*G06N 20/20* (2019.01)
*G06N 7/01* (2023.01)
*G06N 3/047* (2023.01)
*G06N 5/01* (2023.01)
*G06Q 30/0241* (2023.01)
*G06Q 20/12* (2012.01)

(52) U.S. Cl.
CPC ............ *G06N 7/01* (2023.01); *G06F 16/958* (2019.01); *G06N 3/047* (2023.01); *G06N 5/01* (2023.01); *G06N 20/20* (2019.01); *G06Q 20/127* (2013.01); *G06Q 30/0277* (2013.01)

(58) Field of Classification Search
CPC ...... G06N 7/005; G06N 20/20; G06N 3/0472; G06N 5/003; G06N 7/01; G06N 3/047; G06N 5/01; G06F 16/958; G06Q 20/127; G06Q 30/0277
See application file for complete search history.

(56) References Cited

U.S. PATENT DOCUMENTS 8,244,517 B2 * 8/2012 Roy .................... G06F 16/958
703/22
10,909,567 B1 * 2/2021 Patel .................... G06N 3/006
(Continued)

OTHER PUBLICATIONS

Schwartz et al., Customer Acquisition via Display Advertising Using Multi-Armed Bandit Experiments, published Mar. 2016 via University Of Michigan, pp. 1-68 (pdf).*
(Continued)

*Primary Examiner* — Manglesh M Patel
(74) *Attorney, Agent, or Firm* — Eversheds Sutherland (US) LLP

(57) ABSTRACT

Technologies are provided for the generating of optimal policies for bidding in auctions having unknown dynamics. In some embodiments, a computing system can configure many multi-armed bandit (MAB) models defining candidate directed contents for a sequence of pages. A particular MAB model of the many MAB models defines candidate directed contents for a particular page in the sequence of pages, where each arm in the particular MAB model corresponds to a candidate impression on the particular page. The computing system can then determine a solution to an optimization problem with respect to an objective function based on an expected long-term reward for a defined impression on the first page, a defined impression on the second page, and a defined impression on the third page. The solution results in respective directed content for presentation on the first, second, and third pages.

20 Claims, 7 Drawing Sheets

(56) References Cited

U.S. PATENT DOCUMENTS

| | | | |
|---|---|---|---|
| 11,586,965 B1* | 2/2023 | Di Benedetto | G06N 20/00 |
| 2012/0030012 A1* | 2/2012 | Fisher | G06Q 30/0247 |
| | | | 705/14.46 |
| 2017/0103413 A1* | 4/2017 | He | G06Q 30/0244 |
| 2020/0334320 A1* | 10/2020 | Catlin | G06F 16/9535 |
| 2020/0342500 A1* | 10/2020 | Kulkarni | G06Q 30/0277 |
| 2022/0247645 A1* | 8/2022 | Das | G06F 11/3672 |

OTHER PUBLICATIONS

Wang et al., Online Interactive Collaborative Filtering Using Multi-Armed Bandit with Dependent Arms, published Apr. 7, 2020 via IEEE, pp. 1-12 (pdf).*

Arumughom Dhanya, Multi-Armed Bandit Algorithms for Website Optimization, published Nov. 30, 2019 via browsee.io, pp. 1-10 (pdf).*

Komiyama et al., Optimal Regret Analysis of Thompson Sampling in Stochastic Multi-armed Bandit Problem with Multiple Plays, published 2015 via International conference on Machine Learning, pp. 1-10 (pdf).*

Pandey et al., Multi-armed Bandit Problems with Dependent Arms, published 2007 via International conference on machine learning, pp. 1-8 (pdf).*

* cited by examiner

| Scenario | Short-term Rewards | Long-term Rewards |
|---|---|---|
| Page $\Pi_1$ and Page $\Pi_2$ are perused; flow exited at Page $\Pi_2$ | $R_1 = 0$; $R_2 = 1$ | $G_1 = 1$; $G_2 = 1$ |
| Page $\Pi_1$, Page $\Pi_2$, and Page $\Pi_3$ are perused; flow exited with AR-ON | $R_1 = 0$; $R_2 = 0$; $R_3 = 1$ | $G_1 = 1$; $G_2 = 1$; $G_3 = 1$ |
| Page $\Pi_1$, Page $\Pi_2$, and Page $\Pi_3$ are perused; flow exited with AR-OFF | $R_1 = 0$; $R_2 = 0$; $R_3 = 0$ | $G_1 = 0$; $G_2 = 0$; $G_3 = 0$ |

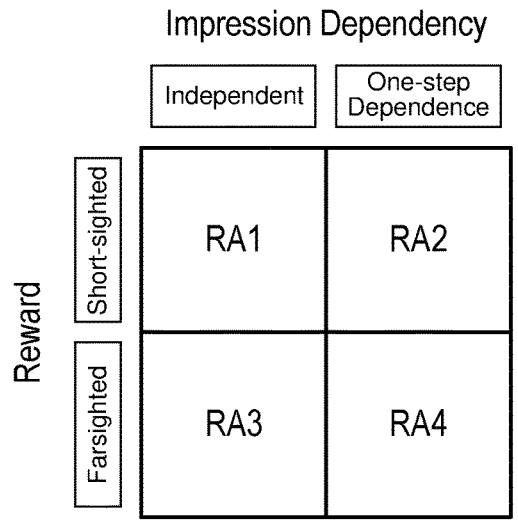

Example of Sequential Thompson Sampling

1: $D1 = D2 = D3 = \emptyset$
2: for $t = 1, \cdots, T$ do
3:     Receive context $x_t$
4:     Sample $\theta^{1t}, \theta^{2t}, \theta^{3t}$ from the posterior $P(\theta^1|D1), P(\theta^2|D2), P(\theta^3|D3)$
5:     For each $j$, find, $k^*(j) := \arg\max_k P[R = 1|x_{t,a2,j,a3,k}, \theta^{3t}]$
6:     For each $i$, find:

$$j^*(i) = \arg\max_j P[R = 1|x_{t,a1,i,a2,j}, \theta^{2t}] + \gamma(1 - P[R = 1|x_{t,a1,i,a2,j}, \theta^{2t}])P[R = 1|x_{t,a2,j,a3,k^*(j)}, \theta^{3t}]$$
$$G(j^*(i), k^*(i)) := \max_j P[R = 1|x_{t,a1,i,a2,j}, \theta^{2t}] + \gamma(1 - P[R = 1|x_{t,a1,i,a2,j}, \theta^{2t}])P[R = 1|x_{t,a2,j,a3,k^*(j)}, \theta^{3t}]$$

7:     Find:

$$i^* = \arg\max_i P[R = 1|x_{t,a1,i}, \theta^{1t}] + \gamma(1 - P[R = 1|x_{t,a1,i}, \theta^{1t}])G(j^*(i), k^*(j^*(i)))$$

8:     Display layout $\{a_{1,i^*}, a_{2,j^*(i^*)}, a_{3,k^*(j^*)}\}$ and observe reward $R_{1t}, R_{2t}, R_{3t}$
9:     Updated $D1 = D1 \cup (x_t, a_{1t}, R_{1t})$
10:    Updated $D2 = D2 \cup (x_t, a_{1t}, a_{2t}, R_{2t})$
11:    Updated $D3 = D3 \cup (x_t, a_{2t}, R_{3t}, R_{3t})$
12: end for

FIG. 5A

| Example of Sequential Thompson Sampling |
|---|
| 1:     $D1 = D2 = \emptyset$ |
| 2:     for $t = 1, \cdots, T$ do |
| 3:         Receive context $x_t$ |
| 4:         Sample $\theta^{1t}, \theta^{2t}$ from the posterior $P(\theta^1\|D1), P(\theta^2\|D2)$ |
| 5:         For each $i$, find: $j*(i) = \arg\max_j P[R = 1\|x_t, a_{1,i}, a_{2,j}, \theta^{2t}]$ |
| 6:         Find: |
|         $i^* = \arg\max_i P[R = 1\|x_t, a_{1,i}, \theta^{1t}] + \gamma(1 - P[R = 1\|x_t, a_{1,i}, \theta^{1t}]) \cdot P[R = 1\|x_t, a_{1,i}, a_{2,j^*(i)}, \theta^{2t}]$ |
| 7:         Display layout $\{a_{1,i^*}, a_{2,j^*(i^*)}\}$ and observe reward $R_{1t}, R_{2t}$ |
| 8:         Updated $D1 = D1 \cup (x_t, a_{1t}, R_{1t})$ |
| 9:         Updated $D2 = D2 \cup (x_t, a_{2t}, R_{2t})$ |
| 10: end for |

FIG. 5B

| Example of bandit-based RL Parameter Estimate |
|---|
| 1: Data: Prior distribution $f, t = 1$ |
| 2: for episodes $k = 1, 2, \cdots,$ do |
| 3:      Estimate posterior $f(\cdot \| H_{t_k})$ for each state on all the actions in terms of bandit algorithm like BLIP |
| 4:      sample $M_k \sim f(\cdot \| H_{t_k})$ |
| 5:      directly calculate the closed form solution of $\mu_k = \mu^{M_k}$ |
| 6:      for page $j = 0, \cdots, T$ do |
| 7:          sample and apply $a_j = \mu_k(s_j, j)$ based on Sequential Thompson Sampling |
| 8:          observe $r_j$ and whether click into next page |
| 9:          If the customer leaves the flow, terminate the loop. |

FIG. 6

DIRECTED CONTENT RECOMMENDATIONS FOR A SEQUENCE OF MULTIPLE PAGES

BACKGROUND

Several techniques are available for generating recommendations of digital content to be placed on webpages or other types of graphical user interfaces. Such recommendations can be applied to a webpage directed to prompting a particular action after content is presented on the webpage. The particular action can be, for example, clicking on or interacting with a selectable graphical element shown on the webpage. The digital content that is recommended for the webpage can be directed to eliciting the particular action.

Some web-based services, however, may rely on presentation of a sequence of multiple webpages that are collectively directed to a particular objective. For example, cancellation of a web-based service can be accomplished by a process flow that includes presenting a few webpages in sequence. Accordingly, an end-user can peruse the webpages sequentially and can perform an action at any of the webpages in the sequence. The end-user also may leave the sequence without perusing the entirety of the digital contents and without performing an action. Further, digital content that is presented on one webpage in the sequence can affect an action performed in a subsequent webpage in the sequence. Such a correlation between webpages in the sequence of webpages can determine whether the particular objective is accomplished. Thus, while independent recommendations for content may be generated individually for each webpage in the sequence, the resulting recommended digital content may be inadequate for causing a particular action associated with the particular objective of the sequence of webpages.

Therefore, several technical challenges remain to be addressed in the generation of recommendations for digital content for sequences of multiple pages.

BRIEF DESCRIPTION OF THE DRAWINGS

The accompanying drawings are an integral part of the disclosure and are incorporated into the subject specification. The drawings illustrate example embodiments of the disclosure and, in conjunction with the description and claims, serve to explain at least in part various principles, features, or aspects of the disclosure. Certain embodiments of the disclosure are described more fully below with reference to the accompanying drawings. However, various aspects of the disclosure can be implemented in many different forms and should not be construed as limited to the implementations set forth herein. Like numbers refer to like elements throughout.

FIG. 4 illustrates a comparison between examples of recommendation approaches, in accordance with one or more embodiments of this disclosure.

FIG. 5A illustrates an example of a method for sequential Thompson sampling, in accordance with aspects of this disclosure.

FIG. 5B illustrates an example of another method for sequential Thompson sampling, in accordance with aspects of this disclosure.

FIG. 6 illustrates an example of a bandit-based method for estimating parameters of a model of a page in a sequence of multiple pages, in accordance with one or more embodiments of this disclosure.

DETAILED DESCRIPTION

Figure 1:
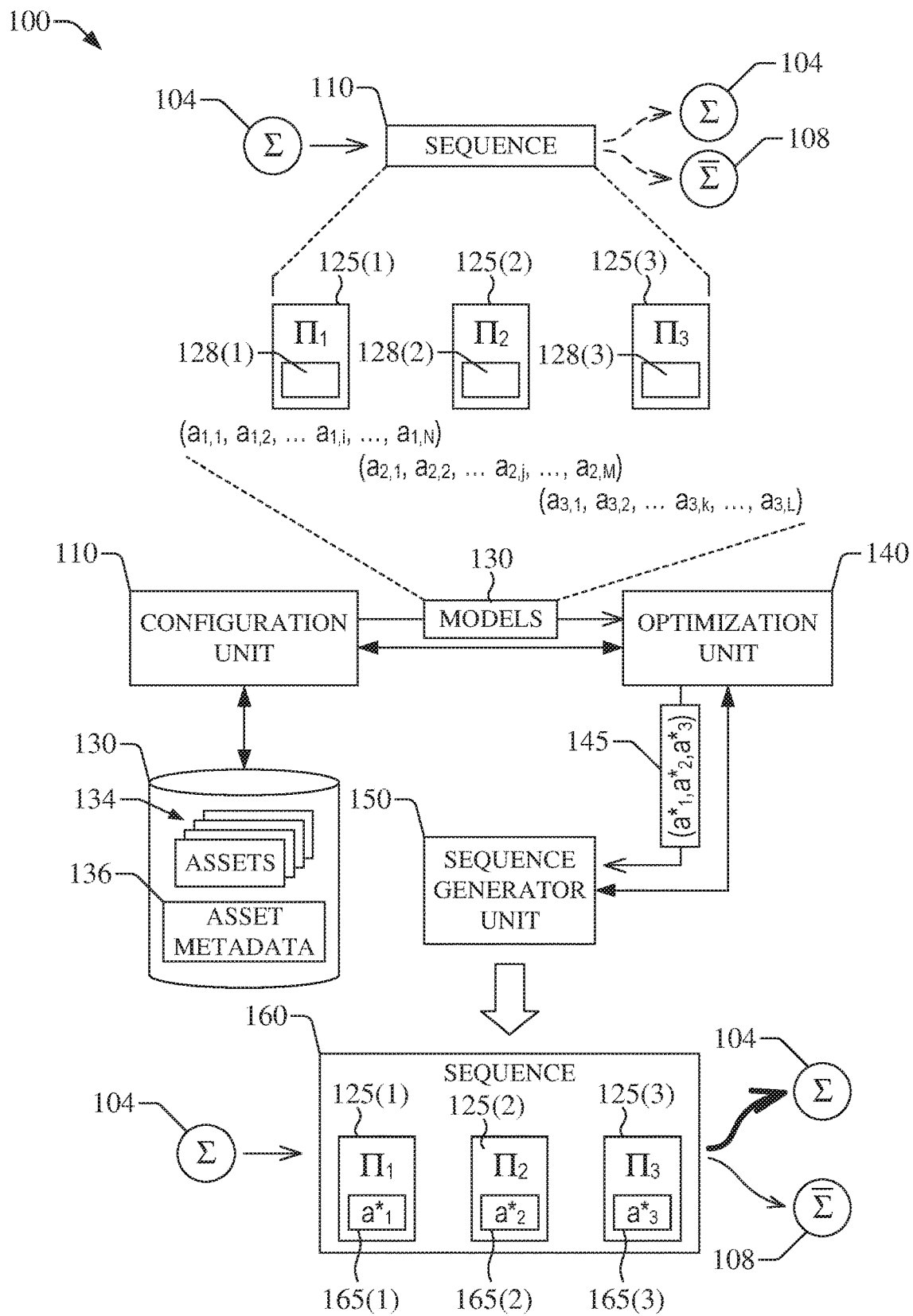
FIG. 1 presents an example of an operational environment for generation of a recommendation for directed content for a sequence of multiple pages, in accordance with one or more embodiments of this disclosure.

The disclosure recognizes and addresses, amongst other technical challenges, the issue of generation of recommendations for digital content to be presented in a sequence of multiple webpages or graphical user interfaces. Such a sequence can correspond to a process for the configuration of a membership to a web-service, for example. Embodiments of the disclosed technologies permit generating a recommendation for digital content for presentation in a sequence of multiple pages (webpages, graphical user interfaces, or similar). Embodiments of the disclosed technologies include a computing system that can configure a multi-armed bandit (MAB) model for each page in the sequence of pages. The MAB model defines candidate directed contents for the page, where each arm in the first MAB model corresponds to a candidate impression on the page. The computing system can then determine a solution to an optimization problem with respect to an objective function based on an expected long-term reward for a defined impression on each page of the sequence of pages. The solution results in respective directed content for presentation on the pages of the sequence of pages. In response to determining that the process for configuration of the membership is initiated, the computing system can cause a computing device to present, partially or entirely, an optimal sequence of pages including the directed content defined by the solution to the optimization problem.

Embodiments of the disclosed technologies can determine the solution to such an optimization problem with low-latency and low-complexity with respect to the number of candidate impression in each page of the sequence of pages. Accordingly, the generation of a recommendation of directed contents for the sequence of pages can utilize computing resources (compute time, storage capacity, network bandwidth, etc.) more efficiently, and also can improve the performance of conventional computing systems utilized to generate such recommendations.

Although embodiments of the disclosed technologies are illustrated with reference to a sequence of three pages (webpages, user interfaces, etc.) corresponding to a cancellation process for terminating a membership to a web-based service, the disclosure is not limited in that respect. Indeed, the principles and practical elements of the technologies disclosed herein can be applied to the generation of recommendations of digital content for other types of sequences of multiple user interfaces and processes designed to attain other objectives. Simply for the purpose of illustration, those objectives can include configuration of a delivery service, configuration of a musical instrument rental service, acceptance of a service or subscription on a trial basis, designed to attain a defined objective and having two possible outcomes, a first outcome of the two possible outcomes corresponding to successful attainment of the objective and a second outcome of the two outcomes corresponding to unsuccessful attainment of the objective; and the like. In addition, one or several of the processes can have one of two possible outcomes; namely, either a first outcome corresponding to successful attainment of an objective that pertains to a process, or a second outcome corresponding to unsuccessful attainment of the objective.

With reference to the drawings, FIG. 1 is a schematic block diagram of an example of an operational environment 100 for generation of a recommendation for directed contents for a sequence of pages, in accordance with one or more embodiments of this disclosure. A page in the sequence of pages refer to particular layout of digital contents covering a defined area available for display in a display device. The layout is characterized by formatting information defining an arrangement of the digital contents, colors, indicia, or other types of elements that convey particular information on the page. As such, each page in the sequence of pages can be, for example, a webpage, a user interface, or similar, that conveys specific information when presented to an end-user.

Digital content on a page can include directed content. For the purpose of illustration, directed content refers to digital media configured for a particular audience and/or a particular outlet channel, such as a website, a streaming service, or a mobile application. Directed content can include, for example, any type of digital media, such as advertisement; music; still images; motion pictures, animations, or other types of video segments; video games; podcasts; and the like. Further, there are many different types of directed content impressions in different contexts.

The operational environment 100 can be applied to generate recommendations for directed contents for a sequence of pages 110. As is illustrated, the sequence of pages 110 can include a first page 125(1), a second page $\Pi_2$ 125(2), and a third page 125(3). Here, simply for the sake of nomenclature, the first page 125(1), the second page 125(2), and the third page 125(3) are labeled as $\Pi_1$, $\Pi_2$, and $\Pi_3$, respectively. It is noted that the disclosed technologies are not limited to a sequence of three pages, and the functionality of the operational environment 100 also is applicable to sequences of pages 110 having less than three pages or more than three pages.

The sequence of pages 110 can be presented on a display device as part of a process flow (or process) configured to manage an aspect of a web-based service. The display device can be integrated, or functionally coupled to a computing device (not depicted in FIG. 1). Thus, the implementation of the process flow can cause a change in a state of an account of the web-based service. The state can be $\Sigma$ 104 prior to the implementation of the process flow, and after the implementation of the process flow, the state $\Sigma$ 104 can remain unchanged or can change to another state $\overline{\Sigma}$ 108. The implementation of the process flow can have two possible outcomes and, therefore, remaining in the state $\Sigma$ 104 can correspond to one of the two outcomes and transitioning to the state $\overline{\Sigma}$ 108 can correspond to the other one of the two outcomes.

In one example scenario, the process flow can be directed to the cancellation of a membership to the web-based service, where the membership includes auto-renewal (AR) of the membership. As such, the initial state $\Sigma$ 104 can correspond to a membership having the auto-renewable feature set to ON. Implementation of such a cancellation process flow can result, in some cases, in the account being retained (not cancelled) and, thus, the state $\Sigma$ 104 remaining the same. In other cases, implementation of the cancellation process flow can result in the cancellation of the membership, with the ensuing transition from the state $\Sigma$ 104 to a state $\overline{\Sigma}$ 108.

Implementation of the process flow can result in the sequential presentation of a portion or the entirety of the sequence of pages 110. Each time a page is presented, the process flow can be terminated, resulting in the initial state remaining unchanged. In some instances, however, the entire presentation of the sequence of pages 110 can result in the initial state $\Sigma$ 104 changes to the other state $\overline{\Sigma}$ 108.

As such, in some embodiments, each one of the pages $\Pi_1$, $\Pi_2$, and $\Pi_3$ can be embodied in a graphical user interface (GUI) having one or several UI control elements. Specifically, such a GUI can include a selectable visual element that, in response to being selected, causes termination of the process. In addition, or in other embodiments, at least some of the pages (e.g., pages $\Pi_1$ and $\Pi_2$) can include a selectable visual element that, in response to being selected, causes a transition from a current page to a next page or another consecutive page in the sequence of pages 110. Further, or in yet other embodiments, at least one of the pages $\Pi_1$, $\Pi_2$, and $\Pi_3$ can include a visual element that, in response to being selected, causes implementation of an update to the membership, with the ensuing transition from the initial state $\Sigma$ 104 to the other state $\overline{\Sigma}$ 108. Such visual elements can be included in one or more pages of the sequence of pages 110 regardless the objective of the process flow.

The directed content presented on each page of the sequence of pages 110 can affect the continuation or termination of the process flow. In a sequential content recommendation, the effect of the sequential presentation of content on a page can be manifested in two directions: An early impression may affect the success probability of a later impression (forward) and a reward can be attributed to not just the immediate last impression but earlier impressions (backward).

In some scenarios, termination of the process flow prior to presentation of the entire sequence of pages 110 is desirable. Specifically, in case of the cancellation process flow, such a termination can maintain an account of a web-service in the initial state $\Sigma$ 104, resulting in the AR feature remaining ON (referred to as AR-ON). Accordingly, the operational environment 100 can generate a recommendation for directed content that can optimize the rate of remaining on the AR-ON state or another target state depending on the particular objective of the process flow. Such a target state can include, for example, a new membership, a post-trial-service membership, a premium membership, upgrade of a current membership, or similar.

To that end, the operational environment 100 can include a configuration unit 110 that can configure a multi-armed bandit (MAB) model for each page in the sequence of pages 110. The configuration unit 110 can select a first group of directed content assets including N items $\{\alpha_{1,1}, \alpha_{1,2}, \ldots \alpha_{1,i}, \ldots \alpha_{1,N}\}$. The directed content assets forming the group can be selected from an inventory of assets 134 within one or more memory devices 130 (referred to as repository 130). The configuration unit 110 can associate the first group with the first page $\Pi_1$ 125(1), where presentation of an asset $\alpha_{1,i}$ (i=1, 2, ..., or N) on the first page $\Pi_1$ 125(1) yields a defined immediate reward. The digital content of the directed content asset $\alpha_{1,i}$ can be presented within a section 128(1) of the page $\Pi_1$. Presentation of the asset $\alpha_{1,i}$ is referred to as an impression $\alpha_{1,i}$.

The configuration unit 110 also can select a second group of directed content assets including M items $\{\alpha_{2,1}, \alpha_{1,2}, \ldots \alpha_{2,j}, \ldots \alpha_{2,m}\}$. The directed content assets forming the group can be selected from an inventory of assets 134. The configuration unit 110 can associate the second group with the second page $\Pi_2$ 125(2), where presentation of an asset $\alpha_{2,j}$ (j=1, 2, ..., or M) on the second page $\Pi_2$ 125(2) yields a defined immediate reward. The digital content of the directed content asset $\alpha_{2,j}$ can be presented within a section 128(2) of the page $\Pi_2$. Presentation of the asset $\alpha_{2,j}$ is referred to as an impression $\alpha_{2,j}$.

In addition, the configuration unit 110 can select a third group of directed content assets including L items $\{\alpha_{3,1}, \alpha_{3,2}, \ldots \alpha_{3,j}, \ldots \alpha_{3,L}\}$. The directed content assets forming the group also can be selected from the inventory of assets 134. The configuration unit 110 can associate the third group with the third page $\Pi_3$ 125(3), where presentation of an asset $\alpha_{3,k}$ (k=1, 2, ..., or L) on the third page $\Pi_3$ 125(3) yields a defined immediate reward. The digital content of the directed content asset $\alpha_{3,k}$ can be presented within a section 128(3) of the page $\Pi_3$. Presentation of the asset $\alpha_{3,k}$ is referred to as an impression $\alpha_{3,k}$.

Each one of the first, second, and third MAB models that is configured can be contextual or non-contextual. For a contextual model, the configuration unit 110 can access data identifying features of directed content impressions. A directed content asset (e.g., $\alpha_{1,i}$, $\alpha_{2,j}$, or $\alpha_{3,k}$) can have an associated context tuple x defining a context of the asset. The context tuple x can be a singlet, a doublet, a triplet, or the like. The data can be retained in one or more memory elements 136 (referred to as asset metadata 136) within the repository 130. Such features can include, for example, size of the impression; position of the impression on a webpage or another type of graphical user interface; an identifier for a mobile application in which the impression is presented or otherwise consumed; recency of the impression; source of the impression; any other attributes that characterize an impression; a time of occurrence of the impression; a target user account for the impression; a combination of the foregoing; or the like.

The configuration unit 110 also can configure an objective function based at least on an expected long-term reward achieved for a defined impression on the first page $\Pi_1$ 125(1), a defined impression on the second page $\Pi_2$ 125(2), and a defined impression on the third page $\Pi_3$ 125(3). The configuration unit 110 can then send model data 130 defining the first, second, and third MAB models and the objective function to an optimization unit 140 also included in the operational environment 100.

The optimization unit 140 can determine a solution to an optimization problem with respect to the objective function. The solution of the optimization problem results in a set of optimal assets 145. In the three-page sequence 110, such a set is represented by the triplet $\{\alpha^*_1, \alpha^*_2, \alpha^*_3\}$. Accordingly, the optimal set of directed content assets defines first directed content for presentation on the first page $\Pi_1$ 125(1); second directed content for presentation on the second page $\Pi_2$ 125(2); and third directed content for presentation on the third page $\Pi_3$ 125(3).

The optimization unit 140 can send the optimal set 145 to a sequence generator unit 150 that can generate an optimal sequence of pages 160. In such a sequence, the first directed content defined by $\alpha^*_1$ is presented in a section 165(1) of the first page 125(1); the second directed content defined by $\alpha^*_2$ is presented in a section 165(2) of the second page 125(2); and the third directed content defined by $\alpha^*_3$ is presented in a section 165(3) of the first page 125(3). In some instances, the sequence generator unit 150 can access formatting information (not depicted in FIG. 1) from the repository 130 in order to generate a satisfactory (e.g., optimal or nearly optimal) layout for the first, second, and third directed contents within respective pages.

In some embodiments, rather than sending the optimal set $\{\alpha^*_1, \alpha^*_2, \alpha^*_3\}$ to the sequence generator unit 150, the optimization unit 140 can retain the optimal set in the repository 130. In response to determining that the particular process flow (e.g., cancellation process flow) is initiated, the sequence generator unit 150 can access data defining the optimal set and can then generate the optimal sequence of pages 160.

Because the optimal set $\{\alpha^*_1, \alpha^*_2, \alpha^*_3\}$ can maximize the objective function configured by the configuration unit 110. The optimal sequence of pages 160 can optimize a rate of obtaining a defined target state $\Sigma$ 104 in response to the implementation of a particular process flow. The optimized rate is represented with a thick arrow in FIG. 1. As mentioned, in some cases, the defined target state $\Sigma$ 104 is AR-ON and the particular process flow is a cancellation process flow.

Figures 2, 3:
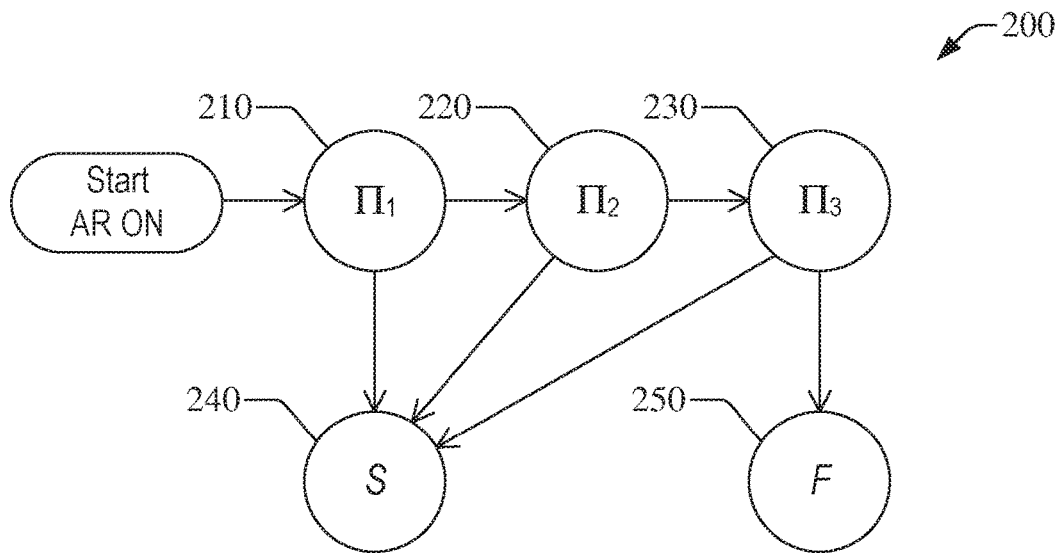
FIG. 2 presents a state-machine representation for an example of a process that can be implemented by accessing a sequence of multiple pages, in accordance with one or more embodiments of this disclosure.
FIG. 3 presents examples of short-term rewards and long-term rewards for different scenarios during implementation of a cancellation process flow, in accordance with one or more embodiments of this disclosure.

In this disclosure, there are numerous ways to generate a recommendation for directed contents to be presented in a sequence of webpages or other types of graphical user interfaces. As is illustrated in FIG. 2, the cancellation process flow corresponding to the sequence of pages 120 can be represented with a state machine 200. The cancellation process flow can begin at page $\Pi_1$, represented with a stage 210, and can transition to one of two other possible stages at each subsequent stage of the flow. The cancellation process flow also has two absorbing stages. An absorbing stage represents a terminal outcome of the cancellation process flow. A first absorbing stage 240 can represent success (S); namely, the cancellation process flow is exited without the termination of the membership. A second absorbing stage 250 represents failure (F); namely, the cancellation process flow 120 is exited with the termination of the membership. More specifically, from the stage 210, the cancellation process flow can proceed to one of a stage 220 representing page $\Pi_2$ or the absorbing stage 240. After a transition to the stage 220, the cancellation process flow 120 can proceed to one of a stage 230 representing page $\Pi_3$ or the absorbing stage 240. A transition to the stage 230 can be followed by a transition to one of the absorbing stage 240 or the absorbing stage 250.

Each transition from a stage representing a page in the state machine 200 can be characterized by a short-term reward R. A short-term reward is referred to as an immediate reward in the framework of reinforcement learning. The short-term reward defines the immediate reward that an agent obtains in response to taking an action in a particular state. Thus, a transition from $\Pi_1$ to the absorbing state 240 can be assigned R=1 (shown in FIG. 2 with a label "1") because such a transition results in the preservation of the membership to the web-based service, which membership can be an auto-renew (AR) membership. In the alternative, and a transition from page $\Pi_1$ to page $\Pi_2$ can be assigned R=0 (shown in FIG. 2 with a label "1"). Similarly, a transition from $\Pi_2$ to the absorbing state 240 also can be assigned R=1 (also shown in FIG. 2 with a label "1") and a transition from page $\Pi_2$ to page $\Pi_3$ can be assigned R=0. In turn, a transition from page $\Pi_3$ to the absorbing state 240 also can be assigned R=1 (also shown in FIG. 2 with a label "1"). Such a transition results in the preservation of the membership to the web-based service, which membership can be an auto-renewal (AR) membership. In the alternative, a transition from page $\Pi_3$ to the absorbing stage 250 can be assigned R=0 because such a transition results in the membership being terminated—e.g., AR membership is OFF after the cancellation process flow 120 ends.

In other words, R=1 if terminating the cancellation process flow 120 for the respective models of page $\Pi_1$ and page $\Pi_2$; if AR-ON for the model of page $\Pi_3$; and R=0 if continuing in the cancellation process flow 120 for the respective models of page $\Pi_1$ and page 112; if AR-OFF for the model of $\Pi_3$. AR-OFF indicates that auto-renew membership is OFF.

Because of the correlation that may exist between a candidate directed content for the sequence of page $\Pi_1$, page $\Pi_2$, and page $\Pi_3$, a long-term reward G can be assigned to a particular candidate directed content within an arrangement of candidate directed contents for the entire sequence of pages $\Pi_1$, $\Pi_2$, and $\Pi_3$. The long-term reward represents the long-term effect of the current action. Accordingly, the long-term reward can be assigned values the following values: G=1 if AR-ON after exiting the cancellation process flow 120; and G=0 if AR-OFF after exiting the cancellation process flow 120.

FIG. 3 presents examples of R and G for different scenarios during the implementation of the cancellation process flow 120. It can be gleaned from FIG. 3 that a same long-term reward can be attained in scenarios yielding different short-term rewards. A policy with short-term reward is myopic as it greedily maximizes the immediate gain after a current action. Such a policy might lead to a suboptimal solution. For example, if we have 2 arms on page $\Pi_1$: $\alpha_{1,1}$ and $\alpha_{1,2}$ and two arms on page $\Pi_2$: $\alpha_{2,1}$ and $\alpha_{2,2}$, it is possible that $\alpha_{1,1}$ performs better than $\alpha_{1,2}$, but the combination ($\alpha_{1,2}$, $\alpha_{2,1}$) performs better than any of the other combinations.

As mentioned, with further reference to FIG. 1, the configuration unit 110 can configure a first MAB model for the page $\Pi_1$ 125(1), a second MAB model for the page $\Pi_2$ 125(2), and a third MAB model for the page $\Pi_3$ 125(3). In some configurations, each one of the first, second, and third MAB models can be independent in that a MAB model does not depend elements (e.g., an impression) of one or both of the other MAB models. In other configurations, one of the first, second, and third MAB models can be independent, and one or both of the other MAB models can be a contextual bandit.

The configuration unit 110 can then can train the first MAB, the second MAB, and the third MAB using either short-term rewards or long-term rewards. By configuring a MAB model (contextual or non-contextual) for each one of page $\Pi_1$ 125(1), page $\Pi_2$ 125(2), and page $\Pi_2$ 125(3), and a mechanism to generate a recommendation for directed content for each one of those pages, the configuration unit 110 can configure an approach for generating a recommendation for directed content for a sequence of pages 110.

For a defined recommendation approach, an optimization unit 140 included in the operational environment 100 can determine a solution to an optimization problem with respect to the expectation value of G over all possible triplets $\{\alpha_{1,1}, \alpha_{2,1}, \alpha_{3,k}\}$ of directed content assets. The solution corresponds to an optimal set of directed content assets (or impressions) $\{\alpha_{1,i}^{(opt)}, \alpha_{2,j}^{(opt)}, \alpha_{3,k}^{(opt)}\}$ to be presented in the sequence of pages 110. More formally, $$\{a_{1,i}^{(opt)}, a_{2,j}^{(opt)}, a_{3,k}^{(opt)}\} = \underset{\{a_{1,i}, a_{2,j}, a_{3,k}\}}{\mathrm{argmax}}\ E(G; a_{1,i}, a_{2,j}, a_{3,k}). \quad (1)$$

In Eq. (1), the E(G; $\alpha_{1,i}$, $\alpha_{2,1}$, $\alpha_{3,k}$) is the expected AR-ON rate per exiting the cancellation flow when the combination $\{\alpha_{1,1}, \alpha_{2,1}, \alpha_{3,k}\}$ is presented as the sequence of pages 120. The manner of determining a solution to Eq. (1) is specific to the defined recommendation approach.

In some recommendation approaches, the optimization unit 140 included in the operational environment 100 (FIG. 1) can utilize short-term rewards as response variables. In other recommendation approaches, in some embodiments, the optimization unit 140 can utilize long-term rewards as response variables. Further, in one recommendation approach, the optimization unit 140 can generate a recommendation for directed content by independently recommending content for each page in the sequence. In another recommendation approach, the optimization unit 140 can generate a recommendation for directed content by recommending content collectively for the multiple pages in the sequence.

Table I summarizes examples of recommendation approaches, in accordance with one or more embodiments of this disclosure. A first recommendation approach (labeled "RA1," for the sake of nomenclature) utilizes respective independent MAB models for pages $\Pi_1$, $\Pi_2$, and $\Pi_3$, and short-term rewards as response variables. A second recommendation approach (labeled "RA2," for the sake of nomenclature) utilizes respective MAB models for pages $\Pi_1$, $\Pi_2$, and $\Pi_3$, where the MAB models include one-step dependence for contiguous pages. Specifically, the configuration unit 110 can configure a first MAB model for page $\Pi_1$; a second MAB model for page $\Pi_2$, where an arm identifier (ID) for content included in page $\Pi_1$ is included as a feature in the second MAB model; and a third MAB model for page $\Pi_3$, where an arm identifier for content included in page $\Pi_2$ is included as a feature in the third MAB model. The approach RA2 also utilizes short-term rewards as response variables.

In addition, a third recommendation approach (labeled "RA3," for the sake of nomenclature) utilizes respective independent MAB models for pages $\Pi_1$, $\Pi_2$, and $\Pi_3$, and long-term rewards as response variables. A fourth recommendation approach (labeled "RA4," for the sake of nomenclature) utilizes respective MAB models for pages $\Pi_1$, $\Pi_2$, and $\Pi_3$, where the MAB models include one-step dependence for contiguous pages. Specifically, the configuration unit 110 can configure a first MAB model for page $\Pi_1$; a second MAB model for page $\Pi_2$, where an arm identifier (ID) for content included in page $\Pi_1$ is included as a feature in the second MAB model; and a third MAB model for page $\Pi_3$, where an arm identifier for content included in page $\Pi_2$ is included as a feature in the third MAB model. The approach RA4 also utilizes short-term rewards as response variables.

As is summarized in Table I, each one of the approaches RA1, RA2 RA3, and RA4 independently generates recommendations for directed content at each one of pages $\Pi_1$, $\Pi_2$, and $\Pi_3$. The respective MAB models of pages $\Pi_2$ and $\Pi_3$ for RA2 and RA4 are contextual, leveraging an arm (or impression) identifier (ID) shown on a previous page as context. It is noted that the disclosed technologies are not limited to that form of contextual MAB model. In some configurations, one or many components of a context tuple x of an impression available for a page in a sequence of pages can be utilized as context in a MAB model of a next page in the sequence of pages.

On the other hand, RA1 and RA3 rely on non-contextual bandits. In each one of RA1 and RA3, the effect of content presented on page $\Pi_2$ is independent of the content presented on page $\Pi_1$. In other words, as long as page $\Pi_2$ has been accessed, the content that has been shown on page $\Pi_1$ would not influence, at page $\Pi_2$, a decision to transition to page $\Pi_3$ or to transition to stage 240 (FIG. 2). In some situations, however, adopting such non-correlation amongst contents in pages $\Pi_2$ and $\Pi_1$ might be inadequate because page $\Pi_1$ and page $\Pi_2$ might contain similar information.

TABLE I

Examples of approaches to generate recommendations for directed contents for a sequence of pages that constitute a cancellation process flow, in accordance with one or more embodiments of this disclosure. The sequence of pages is illustrated as having three pages (See FIG. 1). Each approach is labeled with "RA" and a trailing index, simply for the sake of nomenclature.

| | Offline Training Models | Online Recommendation |
| --- | --- | --- |
| RA1 | Page $\Pi_1$: first MAB model<br>Page $\Pi_2$: second MAB model<br>Page $\Pi_3$: third MAB model<br>Response variables: Short-term rewards | Independently recommend contents for each page $\Pi_m$ (m = 1, 2, and 3) based on respective MAB models. |
| RA2 | Page $\Pi_1$: first MAB model<br>Page $\Pi_2$: second MAB model with arm ID shown on page $\Pi_1$ as a feature<br>Page $\Pi_3$: third MAB model with arm ID shown on page $\Pi_2$ as a feature<br>Response variables: short-term rewards | Independently recommend contents at each page $\Pi_m$ (m = 1, 2, and 3) based on respective MAB models. |
| RA3 | Page $\Pi_1$: first MAB model<br>Page $\Pi_2$: second MAB model<br>Page $\Pi_3$: third MAB model<br>Response variables: long-term rewards | Independently recommend contents at each page $\Pi_m$ (m = 1, 2, and 3) based on respective MAB models. |
| RA4 | Page $\Pi_1$: first MAB model<br>Page $\Pi_2$: second MAB model with arm ID shown on page $\Pi_1$ as a feature<br>Page $\Pi_3$: third MAB model with arm ID shown on page $\Pi_2$ as a feature<br>Response variables: long-term rewards | Independently recommend contents at each page $\Pi_m$ (m = 1, 2, and 3) based on respective MAB model. |

FIG. 4 illustrates differences in reward type and impression dependency amongst the example recommendation approaches summarized in Table I. The first recommendation approach (RA1) is independent on impressions, and is short-sighted because the approach relies on short-term rewards as response variables. The second recommendation approach (RA2) also is short-sighted and includes one-step dependence amongst impressions on consecutive pages. The third recommendation approach (RA3) is independent on impressions, and is farsighted because the approach relies on long-term rewards as response variables. The fourth recommendation approach (RA4) also is farsighted and includes contextual MAB models by means of a one-step dependence amongst impressions on consecutive pages. Such a one-step dependence refers to the incorporation of an element of a MAB model for a prior page into a MAB model for a current page. As is shown in Table 1, in RA4, such an element corresponds to arm ID, e.g., cardinality of an impression in a set of impressions corresponding to respective arms in an MAB model. See FIG. 1. Context also can be introduced by incorporating one or many other features in a MAB model besides one-step dependence amongst impressions on consecutive pages.

As is shown in Table I, RA3 utilizes long-term reward as response variable and assumes independence in sequential impressions (e.g., a current decision is unaffected by a previous impression). Specifically, $$P(S=\alpha_{1,i},\alpha_{2,i})=P(S|\alpha_{2,j})\forall\alpha_{1,i},\alpha_{2,j} \quad (2)$$

and $$P(S|\alpha_{2,j},\alpha_{3,k})=P(S|\alpha_{3,k})\forall\alpha_{2,j},\alpha_{3,k}, \quad (3)$$

Thus, impression independence results in the following reward equations:

$$E[G|a_{1,i}] = P(S|a_{1,i}, a_2 = \emptyset, a_3 = \emptyset) + \quad (4)$$
$$\gamma[1 - P(S|a_{1,i}, a_2 = \emptyset, a_3 = \emptyset)] \cdot E_j[E[G|a_{2,j}]]$$

$$E[G|a_{1,i}, a_{2,j}] = E[G \mid a_{2,j}] = \quad (5)$$
$$P(S|a_{2,j}, a_3 = \emptyset) + \gamma[1 - P(S|a_{2,j}, a_3 = \emptyset)] \cdot E_k[E[G|a_{3,k}]]$$

$$E[G|a_{2,j}, a_{3,k}] = E[G|a_{3,k}] = P(S|a_{3,k}) \quad (6)$$

where $\gamma$ can be set to 1. In embodiments in which $\gamma$ is set to 0, the long-term reward G is the same as short-term reward R. Thus, the MAB models in RA4 can be trained on short-term rewards. As a result, in such embodiments, AR4 coincides with AR1 and the reward equations can be cast as, $$E[G|\alpha_{1,i}]=E[R|\alpha_{1,i}]=P(S|\alpha_{1,i},\alpha_2=\emptyset,\alpha_3=\emptyset) \quad (7)$$

$$E[G|\alpha_{1,i},\alpha_{2,j}]=E[G|\alpha_{2,j}]=E[R|\alpha_{2,j}]=P(S|\alpha_{2,j},\alpha_3=\emptyset) \quad (8)$$

$$E[G|\alpha_{2,j},\alpha_{3,k}]=E[G|\alpha_{3,k}]=E[R|\alpha_{2,j}]=P(|\alpha_{3,k}) \quad (9)$$

In RA2, there is impression independence (FIG. 4) and the MAB models are trained using short-term reward as response variable. As a result, the optimization unit 140 can configure and utilize the following reward equations in the optimization problem posed by Eq. (1):

$$E[G|\alpha_{1,i}]=E[R|\alpha_{1,i}]=P(S|\alpha_{1,i},\alpha_2=\emptyset,\alpha_3=\emptyset) \quad (10)$$

$$E[G|\alpha_{1,i},\alpha_{2,j}]=E[R|\alpha_{1,i},\alpha_{2,j}]=P(S|\alpha_{1,i},\alpha_{2,j},\alpha_3=\emptyset) \quad (11)$$

$$E[G|\alpha_{2,j},\alpha_{3,k}]=E[R|\alpha_{2,j},\alpha_{3,k}]=P(S|\alpha_{2,j},\alpha_{3,k}) \quad (12)$$

In RA4 (Table I), the optimization unit 140 can determine a solution to Eq. (1) by applying reinforcement learning and adopting a one-step dependence (see FIG. 4) for context in at least one of the MAB models. A solution to Eq. (1) can be determined by determining solutions to the maximization of the following expectation values of long-term reward:

$$E[G|\alpha_{1,i}]=P(S|\alpha_{1,i},\alpha_2=\emptyset,\alpha_3=\emptyset)+[1-P(S|\alpha_{1,i},\alpha_2=\emptyset,\alpha_3=\emptyset)]\cdot\gamma\cdot E_j[E[G|\alpha_{1,i},\alpha_{2,j}]] \quad (13)$$

$$E[G|\alpha_{1,i},\alpha_{2,j}]=P(S|\alpha_{1,i},\alpha_{2,j},\alpha_3=\emptyset)+[1-P(S|\alpha_{1,i},\alpha_{2,j},\alpha_3=\emptyset)]\cdot\gamma\cdot E_k[E[G|\alpha_{2,j},\alpha_{3,k}]] \quad (14)$$

$$E[G|\alpha_{2,j},\alpha_{3,k}]=E[R|\alpha_{2,j},\alpha_{3,k}]=P(S|\alpha_{2,j},\alpha_{3,k}) \quad (15)$$

In Eqs. (13), (14), and (15), S represents success, e.g., the cancellation process flow is exited in the AR-ON state; $\emptyset$ indicates that an impression is not presented on a page, which can result from the cancellation process flow being terminated prior to presenting each page in the flow; the condition $\alpha_{1,1}$, $\alpha_2=\emptyset$, $\alpha_3=\emptyset$ represents the event in which the cancellation process flow is terminated in response to presentation of page $\Pi_1$; and $\gamma$ is a reward discount rate that can be set to 1 in RA4.

By relying on success behavior per termination of the cancellation process flow, the MAB models configured in RA4 can maximize the expected long-term rewards based at least on Eqs. (13) to (15). Accordingly, the optimization component 140 can determine a set of optimal impressions $\{\alpha_{1,i}^{(opt)}, \alpha_{2,j}^{(opt)}, \alpha_{3,k}^{(opt)}\}$ respective solutions to the following optimization problems:

$$a_{1,i}^{(opt)} = \operatorname*{argmax}_{a_{1,i}} E[G|a_{1,i}]. \tag{16}$$

$$a_{2,j}^{(opt)} = \operatorname*{argmax}_{a_{2,j}} E\left[G\big|a_{1,i}^{(opt)}, a_{2,j}\right]. \tag{17}$$

$$a_{3,k}^{(opt)} = \operatorname*{argmax}_{a_{3,k}} E\left[G\big|a_{2,j}^{(opt)}, a_{3,k}\right]. \tag{18}$$

While the determination of the optimal directed content assets (or impression) appears to obey a greedy strategy, the determination does incorporate long-term reward by means of the term $E_j[E[G|\alpha_{1,i},\alpha_{2,j}]]$ in Eq. (13) and $E_k[E[G|\alpha_{2,j}, \alpha_{3,k}]]$ in Eq. (14).

Comparison of RA3 and RA1

Both AR1 and AR3 treat impression on consecutive pages as being independent: previous impressions have no impact on a current decision. The approach RT3 considers long-term rewards as response variables and the approach RA1 considers short-term rewards as response variables. See Table I. Without intended to be bound by theory, it can be proven that if the independence assumption holds, then RA1 is the same as RA3 because the long-term reward at page $\Pi_1$ is the sum of short-term reward at page $\Pi_1$, the expected short-term reward at page $\Pi_2$ and page $\Pi_3$. As the expected short-term reward at page $\Pi_2$ and page $\Pi_3$ are independent of page $\Pi_1$, the MAB model can return the same best content on page $P_1$ irrespective of utilizing long-term reward or short-term reward. On the other hand, however, if the independence assumption does not hold, then RA3 can perform better than RA1 because the long-term reward captures a longer effect of the contents presented on page $\Pi_1$ and page $\Pi_2$.

Comparison of RA4 and RA2

Both approaches RA2 and RA4 incorporate dependence between consecutive pages. Such a dependence is incorporated by adding content presented on a prior page as a feature of MAB models. See Table I. The approach RA4 considers long-term reward, and the approach RA2 considers short-term reward. Without intending to be bound by theory, if the dependence assumption holds, then the approach RA2 can be a sub-optimal solution of the approach RA4.

Comparison of RA3 and RA4

If the dependence assumption holds, then RA4 would perform better than RA3 because RA4 incorporate content shown on a prior page as a feature of MAB models. See Table I. If the dependence assumption does not hold, however, RA3 can converge much faster than RA4. Thus, the opportunity cost could be lower. On the other hand, if enough traffic is available, RA4 is supposed to converge to the same content at each segment of Page 2 (Page 3) and, therefore, can perform similarly to RA3 after convergence.

The configuration unit 110 (FIG. 1) also can configure other recommendation approaches. Table II summarizes examples of recommendation approaches that generate a content recommendation for multiple pages collectively, rather than independently for each one the multiple pages, in accordance with one or more embodiments of this disclosure. The recommendation approaches are labeled "RA5" and "RA6" simply for the sake of nomenclature.

TABLE II

Examples of recommendation generate recommendations for directed contents for a sequence of pages that constitute a cancellation process flow, in accordance with one or more embodiments of this disclosure. The sequence of pages is illustrated as having three pages (see FIG. 1). Each approach is labeled with "RA" and a trailing index, simply for the sake of nomenclature.

| | Offline Training Models | Online Recommendation |
| --- | --- | --- |
| RA5 | One MVT model where each page is a dimension and each candidate message is a variation of the dimension Response variables: long-term rewards | Recommend contents for pages $\Pi_1$, $\Pi_2$, and $\Pi_3$ collectively based at least on the MVT model. |
| RA6 | Page $\Pi_1$: first MAB model Page $\Pi_2$: second MAB model with arm ID shown on page $\Pi_1$ as a feature Page $\Pi_3$: third MAB model with arm ID shown on page $\Pi_2$ as a feature Response variables: short-term rewards | Recommend contents for pages $\Pi_1$, $\Pi_2$, and $\Pi_3$ collectively based at least on overall success rate: $P_1 + (1 - P_1)^* P_2 + (1 - P_1)(1 - P_2) * P_3$, where $P_1$, $P_2$, and $P_3$ are success rates on page $\Pi_1$, page $\Pi_2$, and page $\Pi_3$, respectively. |

In RA6, generation of content recommendations are based on the overall success rate of a particular configuration of directed content assets in retaining a membership of a web-based service. Here, $x_1$, $x_2$, $x_3$ represent the contents on page $\Pi_1$, page $\Pi_2$, and page $\Pi_3$, respectively, and $P_1(x_1)$, $P_2(x_1, x_2)$, $P_3(x_2, x_3)$ represent the probability of leaving the cancellation flow with AR-ON on page $\Pi_1$, page $\Pi_2$, and page $\Pi_3$, respectively. Without intending to be bound by theory or modeling, the success rates at each page are considered to be only dependent on the contents of current page and the previous page.

As is summarized in Table II, RA6 relies on MAB models trained using short-term rewards as response variables. In some embodiments, Bayesian linear probit regression (BLIP) models also can be configured. A first BLIP model, a second BLIP model, and a third BLIP model also can be trained using short-term rewards as response variables. Those BLIP models, however, are for the purpose of estimating parameters rather than directly making decisions. Bandit models can be utilized to estimate probabilities.

In RA6, the overall success rate $\mathcal{P}$ can be decomposed into three components: success rate at page $\Pi_1$, success rate at $\Pi_2$ if failed at page $\Pi_1$, and success rate at page $\Pi_3$ if failed at both page $\Pi_1$ and page $\Pi_2$. Mathematically, maximizing $\mathcal{P}$ corresponds to maximizing expression below:

$$\mathcal{P} = P_1(x_1) + (1-P_1(x_1))P_2(x_1,x_2) + (1-P_1(x_1))(1-P_2(x_1, x_2))P_3(x_2,x_3) \tag{19}$$

Accordingly, maximizing $\mathcal{P}$ corresponds to maximizing the expression in the left-hand side of Eq. (19).

In Eq. (19), $P_1(x_1)$, $P_2(x_1, x_2)$, $P_3(x_2, x_3)$ can be estimated based on generalized linear regression models of a bandit. To balance exploration and exploitation, in some embodiments, Thompson sampling can be applied to sample out parameters for each of the MAB models for pages $\Pi_1$, $\Pi_2$, and $\Pi_3$. Dynamic programming can be utilized to find the best combination of the directed contents under the parameters.

In some embodiments, in RA6, the optimization unit 140 can generate content recommendations based at least on sequential Thompson sampling in accordance with aspects described herein. More concretely, in RA6, the optimization unit 140 can generate an action set $\{\alpha_1, \alpha_2, \alpha_3\}$ as a whole, where the elements of the action set are selected concurrently. Specifically, the optimization unit 140 can determine such an action set using the probability of the action set being long-term optimal for pages $\Pi_1$, $\Pi_2$, and $\Pi_3$ collectively:

$$\int \mathbb{1}\left[E[G; a_1, a_2, a_3, \theta^1, \theta^2, \theta^3]\right] = \max_{(a'_1, a'_2, a'_3,)} E(G; a'_1, a'_2, a'_3, \theta^1, \theta^2, \theta^3)\right] \quad (20)$$
$$P(\theta^1|D_1)P(\theta^2|D_2)P(\theta^3|D_3)d\theta^1 d\theta^2 d\theta^3$$

In Eq. (19), $\Pi(\cdot)$ is the indicator or predicate function. E[G; $\alpha_1$, $\alpha_2$, $\alpha_3$, $\theta^1$, $\theta^2$, $\theta^3$] is the probability of AR-ON per exiting the process.

To that end, the optimization unit 140 can apply the sequential Thompson sampling technique in accordance with this disclosure, as is defined in FIG. 5A or FIG. 5B. The rewards E[R|$\alpha_1$, $\theta^1$], E[R|$\alpha_1$,$\alpha_2$, $\theta^2$], and E[R|$\alpha_2$, $\alpha_3$, $\theta^3$] are, respectively, short-term rewards of impressions (or actions) at pages $\Pi_1$, $\Pi_2$, and $\Pi_3$. In an instance in which true model parameters $\{\theta^{1*}, \theta^{2*}, \theta^{3*}\}$ are available, the optimization unit 140 can determine actions (or impressions) that maximize the expected long-term reward G:

$$\{a^*_{1,i}, a^*_{1,i}, a^*_{1,i}\} = \underset{\{a_{1,i},a_{2,j},a_{3,k}\}}{\mathrm{argmax}}\ E[G; x, a_{1,i}, a_{2,j}, a_{3,k}, \theta^{1*}, \theta^{2*}, \theta^{3*}]. \quad (21)$$

In Eq. (20), $$E]G;x,\alpha_{1,i},\alpha_{2,j},\alpha_{3,k},\theta^{1*},\theta^{2*},\theta^{3*}]=P(R=1|x,\alpha_{1,i},\theta^{1*})+ \\ [1-P(R=1|x,\alpha_{1,i},\theta^{1*})]\cdot\gamma\cdot E[G|x,\alpha_{1,i},\alpha_{2,j},\theta^{2*},\theta^{3*}] \quad (22)$$

where $$E]G|x,\alpha_{1,i},\alpha_{2,j},\theta^{2*},\theta^{3*}]=P(R=1|x,\alpha_{1,i},\alpha_{2,j},\theta^{2*})+[1-P \\ (R=1|x,\alpha_{1,i},\alpha_{2,j},\theta^{2*})]\cdot\gamma\cdot E[G|x,\alpha_{2,j},\alpha_{3,k},\theta^{3*}] \quad (23)$$

and $$E[G|x,\alpha_{2,j},\alpha_{3,k},\theta^{3*}]=P(R=1|x,\alpha_{2,j},\alpha_{3,k},\theta^{3*}). \quad (24)$$

The optimization unit 140 can maximize E[G; x, $\alpha_{1,1}$, $\alpha_{2,1}$, $\alpha_{3,k}$, $\theta^{1*}$, $\theta^{2*}$, $\theta^{3*}$] by determining, for each j, an optimal decision for page $\Pi_3$ according to, $$k^*(j) = \underset{k}{\mathrm{argmax}}\ E\left[G|x, a_{2,j}, a_{3,k}, \theta^{3*}\right] \quad (25)$$

in order to maximize AR-ON probability in response to the presentation of page $\Pi_3$. In addition, for each i, the optimization unit 140 can determine an optimal directed content asset (or impression, which also may be referred to as an action) on page $\Pi_2$:

$$j^*(i) = \underset{j}{\mathrm{argmax}}\ E\left[G|x, a_{1,i}, a_{2,j}, \theta^{2*}, \theta^{3*}\right] = \quad (26)$$
$$\underset{j}{\mathrm{argmax}}\ P\left[R=1|x, a_{1,i}, a_{2,j}, \theta^{2*}\right]+$$
$$\gamma(1 - p[R=1|x, a_{1,i}, a_{2,j}, \theta^{2*}]) \cdot P[R=1|x, a_{2,j}, a_{3,k^*(j)}, \theta^{3*}]$$

The maximum value defined by Eq. (25) can be represented as follows:

$$G(j^*(i), k^*(j(i))) = \max_j\ P[R=1\,|\,x, a_{1,i}, a_{2,j}, \theta^{2*}]+ \quad (27)$$
$$\gamma(1 - P[R=1\,|\,x, a_{1,i}, a_{2,j}, \theta^{2*}]) \cdot P[R=1\,|\,x, a_{2,j}, a_{3,k^*(j)}, \theta^{3*}]$$

The optimization unit 140 can determine an optimal directed content asset (or impression, which also may be referred to as an action) on page $\Pi_1$ by defining the following optimization problem:

$$i^* = \underset{i}{\mathrm{argmax}}\ E\left[G|x, a_{1,i}, a_{2,j}, a_{3,k}, \theta^{1*}, \theta^{2*}, \theta^{3*}\right] = \quad (28)$$
$$\underset{i}{\mathrm{argmax}}\ P[R=1|x, a_{1,i}, \theta^{1*}]+$$
$$\gamma(1 - P[R=1|x, a_{1,i}, \theta^{1*}]) \cdot G(j^*(i), k^*(j^*(i)))$$

Therefore, the optimal action set is $\{\alpha_{1,i}*, \alpha_{2,j}*, \alpha_{3,k}*\}$.

The set of optimal parameters $\{\theta^{1*}, \theta^{2*}, \theta^{3*}\}$, however, is unknown. Without intending to be bound by theory or modeling, in an exploration/exploitation setting, the optimization unit 140 can apply a probability matching heuristic that includes randomly selecting directed content asset (or impression, which also may be referred to as an action) according to the probability of such an action being optimal. As such, the optimization unit 140 can generate a random parameter $\{\theta^{1*}, \theta^{2*}, \theta^{3*}\}$ at each round t, and select an optimal action set $\{\alpha_{1,i}*, \alpha_{2,1}*, \alpha_{3,k}*\}$ using the generated set of random parameters.

To balance exploration and exploitation, in some embodiments, Thompson sampling can be applied to sample out parameters for each one of the MAB models that constitutes the RA6. Dynamic Programming can be utilized to find the best combination of the directed contents under such parameters. More concretely, for the BLIP models, P[R=1|$x_t$,$\alpha_1$, $\theta^{1t}$]=g($B_{\alpha_1,x_t}^T\theta^{1t}$), P[R=1|$x_t$,$\alpha_1$,$\alpha_2\theta^{2t}$]=g($B_{\alpha_1,\alpha_2,\alpha_{12},x_t}T\theta^{2t}$),P[R=1|$x_t$, $\alpha_2$,$\alpha_2$,$\alpha3\theta^{2t}$]=g($B_{\alpha_2,\alpha_3,\alpha_{23},x_t}T\theta^{3t}$). Here $x_t$ is a context at round t; g is a linking function (the probit function for BLIP, for example); $B_{\alpha_1,x_t}$ is a concatenate vector of one-hot encoding $\alpha_1$ and $x_t$; and $\theta^{1t}$, $\theta^{2t}$, and $\theta^{3t}$ are weight vectors that can be updated by minimizing the Kullback-Leibler (KL) divergence in BLIP.

FIG. 5A illustrates an example of method 500 for sequential Thompson sampling in accordance with aspects of this disclosure. The example method 500 can be implemented for three-page scenarios, where a process flow includes a three-page sequence. In some instances, directed contents for the first and second pages in a three-page sequence can be selected from a pool of directed content assets (e.g., assets 134 (FIG. 1)), whereas directed content presented at the third page in the three-page sequence can remain invariant. For example, with reference to FIG. 1, directed content presented at page $\Pi_1$ 125(1) and Page $\Pi_2$ 125(2) can be selected from the sets $\{\alpha_{1,1}, \alpha_{1,2}, \alpha_{1,N}\}$ and $\{\alpha_{1,1}, \alpha_{1,2}, \alpha_{1,M}\}$, respectively, whereas directed content presented at page $\Pi_3$ 125(3) is fixed at a particular one of $\{\alpha_{3,1}, \alpha_{3,2}, \ldots, \alpha_{3,L}\}$. In those instances, the optimization unit 140 can implement the sequential Thompson sampling according to the example method 550 shown in FIG. 5B, which method is applicable to a two-page sequence.

Without intended to be bound by theory or modeling, or both, the sequential Thompson sampling with BLIP parameter updating can be reformulated into a Posterior Sampling for Reinforcement Learning (PSRL) algorithm in solving Markov decision process (MDP), where the posterior distribution of all the Q functions is estimated. An MDP can then be sampled based on the distribution. Finally, an online recommendation for a sequence of pages can be generated by solving the MDP. The optimal combination of impression that maximizes the overall success rate (see Eq. (19), for example) can be determined by solving a sampled MDP. The sampling implemented in accordance with the sequence Thompson sampling disclosed herein. FIG. 6 illustrates an example of a bandit-based method 600 for estimating parameters of a model of a page in a sequence of pages (such as sequence of pages 110).

Because the example method 600 permits solving the sampled MDP analytically, a solution to the optimization problem with respect to overall success rate (overall conversion rate, overall retention rate, etc.) of a defined process flow can be implemented with complexity of $O(U^2)$ where U in the number of candidate impressions in each page within a sequence of pages. Simply an example, for the sequence of pages 110 shown in FIG. 1 (e.g., U can be equal to N, M, and L when solving for parameters of the models for pages $\Pi_1$, $\Pi_2$, and $\Pi_3$, respectively. Further, the sampled MDP can be solved with low latency and, therefore, recommendation for directed contents for a sequence of pages can be performed online for large-scale use cases. As a result, the disclosed technologies utilize computing resources (compute time, storage capacity, network bandwidth, etc.) more efficiently, and improve the performance of computing systems utilized to generate recommendations of directed content for sequence of pages.

Comparison of RA2 and RA6

Both RA2 and RA6 utilize short-term reward and assume one-step dependence (FIG. 4). The approach RA6 can generate recommendations under overall success rate, whereas the approach RA2 can generate recommendations under short-term success rate. Therefore, RA6 is similar to RA4 and can be a better solution if the dependence assumption holds,

TABLE III

Comparison of recommendation approaches AR4 and AR6 for a cancellation process flow having an associated sequence of three pages, in accordance with aspects of this disclosure.

| | Model Training | Online Recommendation |
| --- | --- | --- |
| AR4 | Model long-term reward | After sampling, directly determine each of the optimal directed content assets independently. |
| AR6 | Model short-term reward | After sampling, select optimal asset set $\{a_1, a_2, a_3\}$ collectively that maximizes overall rewards. |

Comparison of RA4 and RA6

It is noted that both RA4 and RA6 can achieve the goal of optimizing long-term rewards. Recommendation approach RA4 directly models the long-term reward (AR-ON per exiting the flow) and selects directed content assets (or actions or impressions) that are a solution to Eq. (1) based on the MAB models independently. On the other hand, AR6 models the short-term reward and can determine an optimal set of directed content assets concurrently to optimize overall performance, The approach RT4 may require, in some instances, sequential convergence. The traffic at page $\Pi_3$ converges at first, and then the traffic at page $\Pi_2$ converges based on the converged page $\Pi_3$ traffic. Finally, the traffic at page $\Pi_1$ converges based on the converged page $\Pi_2$ traffic. The approach RA6 makes a decision for the three pages collectively. Therefore, the traffic of all three pages can converge at the same time. Without intending to be bound by modeling, the approach RT6 can converge faster than AR4 because AR6 can directly assign more traffic to the optimal action set, whereas for RA4, the optimal decision of page $\Pi_1$ may need to wait for the convergence of page $\Pi_2$ and page $\Pi_3$.

Figure 7:
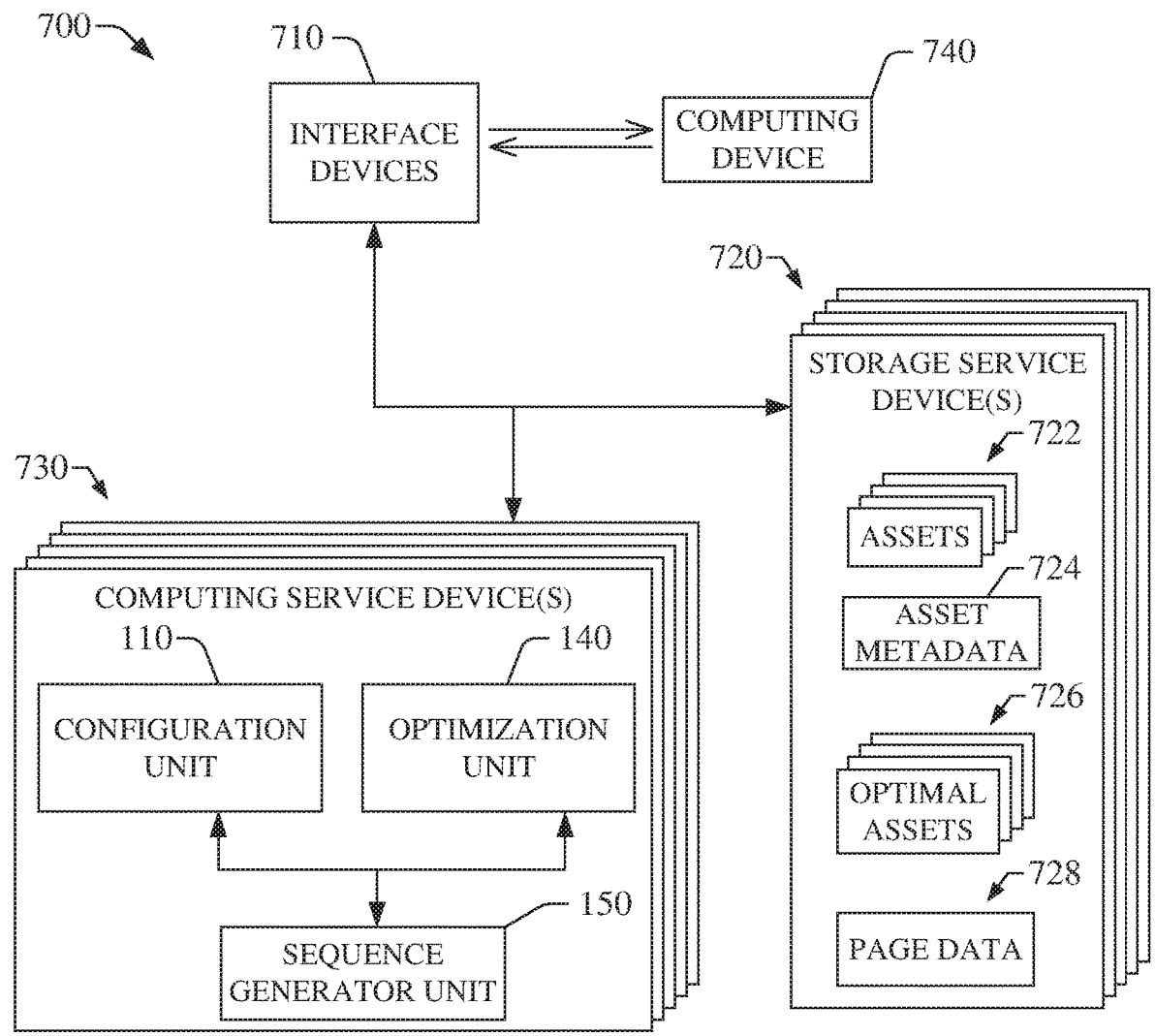
FIG. 7 illustrates an example of a computing system for generation of a recommendation for directed content for a sequence of multiple pages, in accordance with one or more embodiments of this disclosure.

FIG. 7 is a schematic block diagram of an example of a computing system 700 for generation of recommendation for directed contents for a sequence of multiple pages, in accordance with one or more embodiments of this disclosure. The computing system 700 can generate such a recommendation according to the approaches disclosed hereinbefore. As an illustration, the computing system 200 can generate recommendation of directed contents for a sequence of webpages included in a process flow for cancellation of web-based service.

The example computing system 700 includes interface devices 710 that can access an inventory of assets 722. In some embodiments, the interface devices 710 also can access asset metadata 724 for context. The interface devices 710 can include one or many processors functionally coupled to one or many memory devices that retain a data collection module. In some configurations, the data collection module can include an application programming interface (API) and/or another type of program code that can permit receiving data defining an asset or asset metadata, or both, via a function call, for example. At least one of the processor(s) can execute the data access module to receive at least some of the data defining an asset and/or asset metadata corresponding to the asset.

The example computing system 700 can include one or many computing service devices 730. As is illustrated in FIG. 7, the computing service device(s) 730 can include the configuration unit 110, the optimization unit 140, and the sequence generator unit 150. Each one of these units can operate in accordance with functionality described herein. As is described hereinbefore, the optimization unit 140 can determine a set of optimal directed content assets. The optimization unit 140 can retain data identifying those assets in one or more memory elements 726 (referred to as optimal assets 726) within at least one of the storage service device(s) 720. The sequence generator unit 150 can generate page data defining an optimal sequence of pages (e.g., sequence 160) that contain optimal assets determined by the optimization unit 140. Page data can be retained in one or more memory device 728 in the storage service device(s) 720.

The example computing system 700 can be functionally coupled, by means of at least one of the interface devices 710, to a computing device 740 remotely located relative to the example computing system 700. Generated page data corresponding to an optimal sequence of pages can be sent to the computing device 740 for presentation in response to implementation of a process flow that includes the optimal sequence of pages.

Figure 8:
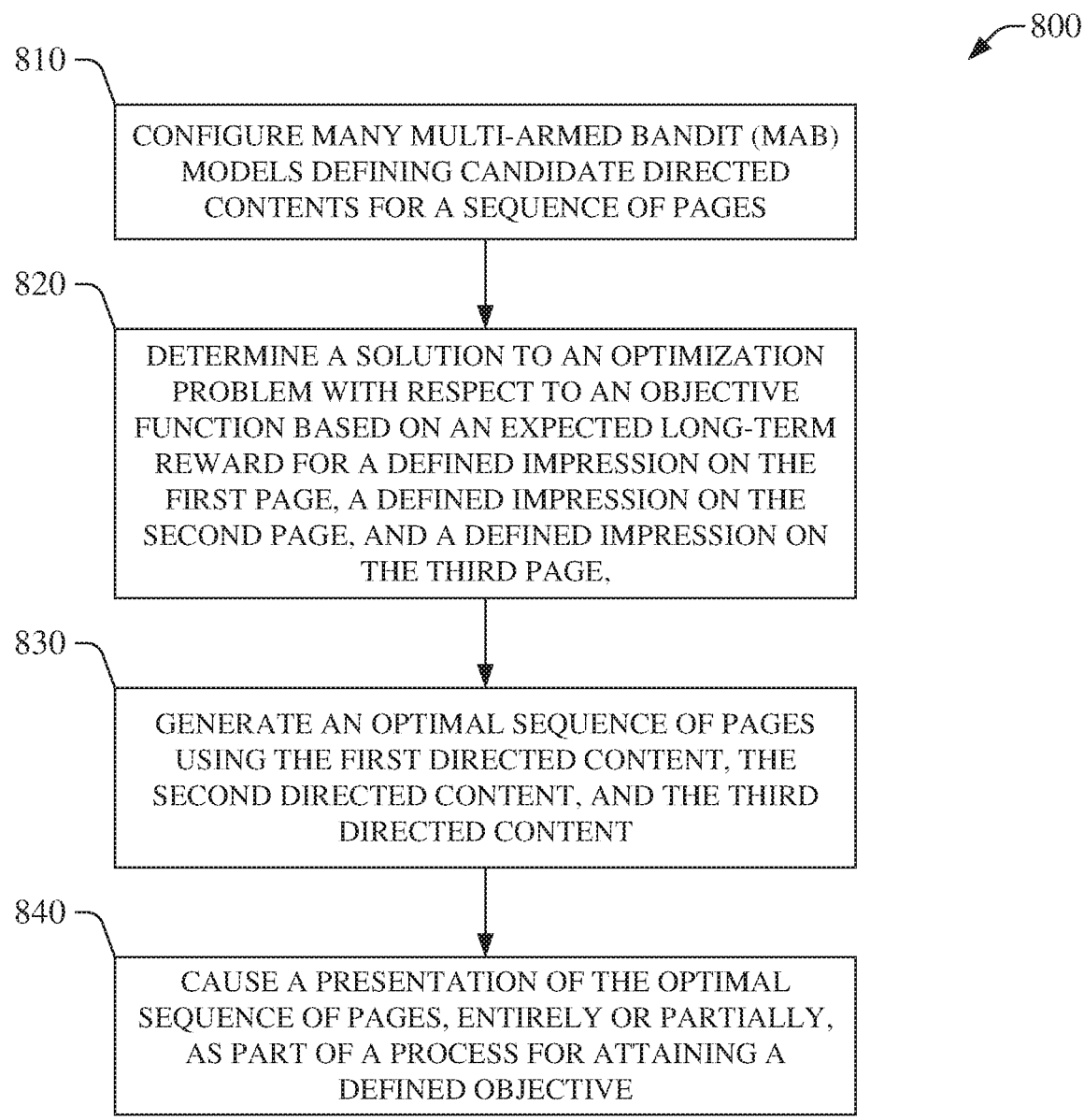
FIG. 8 illustrates an example of a method for generating recommendations for directed content for a sequence of multiple pages, in accordance with one or more embodiments of this disclosure.

In view of the aspects of the techniques disclosed herein, an example method that can be implemented in accordance with the disclosure can be more readily appreciated with reference to the flowchart in FIG. 8. For purposes of simplicity of explanation, the example methods disclosed herein are presented and described as a series of blocks (with each block representing an action or an operation in a method, for example). However, it is to be understood and appreciated that the disclosed methods are not limited by the order of blocks and associated actions or operations, as some blocks may occur in different orders and/or concurrently with other blocks that are shown and described herein. For example, the various methods or processes of the disclosure can be alternatively represented as a series of interrelated states or events, such as in a state diagram. Furthermore, not all illustrated blocks, and associated action(s), may be required to implement a method in accordance with one or more aspects of the disclosure. Further yet, two or more of the disclosed methods or processes can be implemented in combination with each other, to accomplish one or more functionalities and/or advantages described herein.

It is noted that the methods of the disclosure can be retained on an article of manufacture, or computer-readable medium, to permit or facilitate transporting and transferring such methods to a computing device (e.g., a desktop computer; a mobile computer, such as an electronic book reader (e-reader) or other tablets, or a smartphone; a gaming console, a mobile telephone; a blade computer; a programmable logic controller, and the like) for execution, and thus implementation, by a processor of the computing device or for storage in a memory thereof or functionally coupled thereto. In one aspect, one or more processors, such as processor(s) that implement (e.g., execute) one or more of the disclosed methods, can be employed to execute code instructions retained in a memory, or any computer- or machine-readable medium, to implement the one or more methods. The code instructions can provide a computer-executable or machine-executable framework to implement the methods described herein.

FIG. 8 is a flowchart of an example of a method 800 for generating recommendations for directed contents for a sequence of pages, in accordance with one or more embodiments of this disclosure. As mentioned, such a sequence can include two or more pages and, in some embodiments, the sequence can be a part of a process flow designed to attain a defined objective—e.g., cancellation of a web-based service or configuration of other elements of the web-based service; acceptance of a web-based service on a trial basis; acquisition of premium digital content; upgrade of an extant membership; or similar. Implementation of the process flow can result in two outcomes represented by respective states: A first state corresponding to successful attainment of the objective and a second state corresponding to unsuccessful attainment of the objective. For example, the first state can be the stage 240 and the second state can be the stage 250. See FIG. 2.

Regardless of the directed contents included in each page of the sequence of pages, each page can include a first selectable visual element that, in response to being selected, causes termination of the process. In addition, or in some embodiments, one or more of the pages in the sequence of pages can include a visual element that, in response to being selected causes implementation of an action corresponding to the objective. The process defines such an action.

In some embodiments, a computing system that has at least one processor and/or is functionally coupled to at least one processor can implement (e.g., compile, execute, compile and execute, etc.) one or more blocks of the example method 800. In some scenarios, one or more blocks of the example method 800 can be implemented in a distributed fashion by two or more computing devices contained in the computing system. Each of the two or more computing devices can have at least one processor or can be functionally coupled to at least one processor, where such processor(s) can implement at least one of the one or more blocks. Regardless of the example method 800 being implemented by a distributed or non-distributed computing system, the at least one processor can be functionally coupled to at least one memory device or other types of computer-readable non-transitory storage media.

At block 810, the computing system can configure many MAB models defining candidate directed contents for a sequence of pages (webpages, graphical user interfaces, or similar). A first MAB model of the many MAB models defines candidate directed contents for a first page in the sequence of pages, where each arm in the first MAB model corresponds to a candidate impression on the first page. A second MAB model of the multiple MAB models defines candidate directed contents for a second page in the sequence of pages, each arm in the second MAB model corresponds to a candidate impression on the second page. A third MAB model of the multiple MAB models defines candidate directed contents for a third page in the sequence of pages, each arm in the third MAB model corresponds to a candidate impression on the third page.

At block 820, the computing system can determine a solution to an optimization problem with respect to an objective function based at least on an expected long-term reward for a defined impression on the first page, a defined impression on the second page, and a defined impression on the third page. The solution results in first directed content for presentation on the first page, second directed content for presentation on the second page, and third directed content for presentation on the third page.

At block 830, the computing system can generate an optimal sequence of pages using the first directed content, the second directed content, and the third directed content. At block 840, the computing system can cause entire or partial presentation of the optimal sequence of pages at a computing device (mobile or otherwise) as part of a process flow designed to attain a defined objective. In one embodiment, the defined objective can include configuration of a membership to a web-based service. The computing device can be remotely located relative to the computing system.

Figure 9:
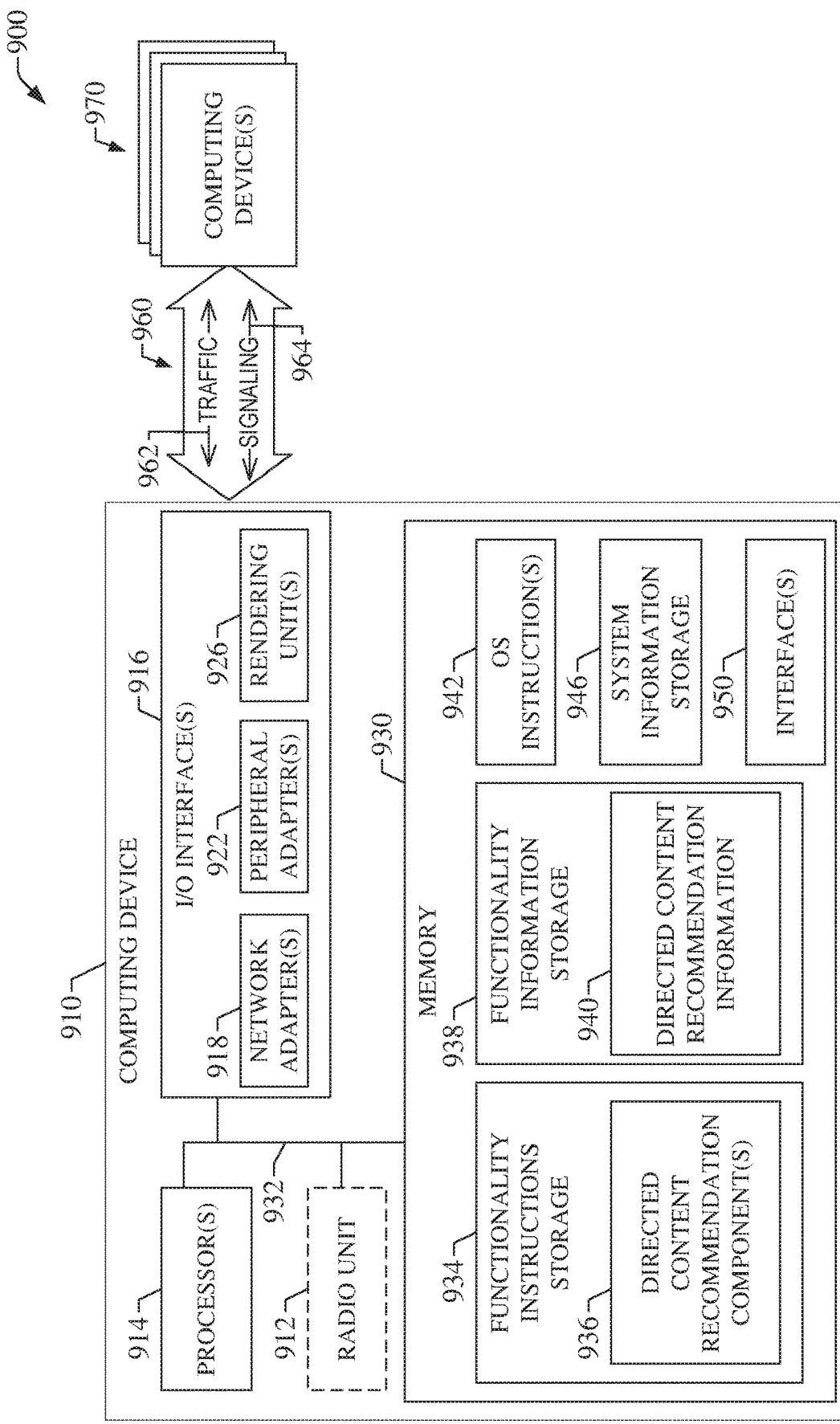
FIG. 9 illustrates an example of a computational environment for generation of a recommendation for directed content for a sequence of multiple pages, in accordance with one or more embodiments of the disclosure.

FIG. 9 illustrates a block diagram of an example computational environment 900 for generation of a recommendation for directed content for a sequence of multiple pages, in accordance with one or more aspects of the disclosure. The example computational environment 900 is merely illustrative and is not intended to suggest or otherwise convey any limitation as to the scope of use or functionality of the computational environment's architecture. In addition, the illustrative computational environment depicted in FIG. 9 should not be interpreted as having any dependency or requirement relating to any one or combination of components illustrated in the example operational environments of the disclosure. The example computational environment 900 or portions thereof can embody, or can include, for example, one or more of the operational environment 100 or the computing system 900.

The computational environment 900 represents an example implementation of the various aspects or features of the disclosure in which the processing or execution of operations described in connection with the generation of a recommendation for directed content for a sequence of multiple pages, as is disclosed herein, can be performed in response to execution of one or more software components at the computing device 910. It should be appreciated that the one or more software components can render the computing device 910, or any other computing device that contains such components, a particular machine for generation of a recommendation for directed content for a sequence of multiple pages, as is described herein, among other functional purposes. A software component can be embodied in or can comprise one or more computer-accessible instructions, e.g., computer-readable and/or computer-executable instructions. In one scenario, at least a portion of the computer-accessible instructions can embody and/or can be executed to perform at least a part of one or more of the example methods disclosed herein, such as the example method presented in FIG. 8.

For instance, to embody one such method, at least the portion of the computer-accessible instructions can be persisted (e.g., stored, made available, or stored and made available) in a computer storage non-transitory medium and executed by a processor. The one or more computer-accessible instructions that embody a software component can be assembled into one or more program modules, for example, that can be compiled, linked, and/or executed at the computing device 910 or other computing devices. Generally, such program modules comprise computer code, routines, programs, objects, components, information structures (e.g., data structures and/or metadata structures), etc., that can perform particular tasks (e.g., one or more operations) in response to execution by one or more processors, which can be integrated into the computing device 910 or functionally coupled thereto.

The various example embodiments of the disclosure can be operational with numerous other general purpose or special purpose computing system environments or configurations. Examples of well-known computing systems, environments, and/or configurations that can be suitable for implementation of various aspects or features of the disclosure in connection with the generation of a recommendation for directed content for a sequence of multiple pages, as is described herein, can include personal computers; server computers; laptop devices; handheld computing devices; and multiprocessor systems. Additional examples can include set-top boxes, programmable consumer electronics, network personal computers (PCs), minicomputers, mainframe computers, blade computers, programmable logic controllers, distributed computing environments that include any of the above systems or devices, and the like.

As illustrated, the computing device 910 can comprise one or more processors 914, one or more input/output (I/O) interfaces 916, a memory 930, and a bus architecture 932 (also termed bus 932) that functionally couples various functional elements of the computing device 910. In certain embodiments, the computing device 910 can include, optionally, a radio unit 912. The radio unit 912 can include one or more antennas and a communication processing unit that can permit wireless communication between the computing device 910 and another device, such as one of the computing device(s) 970. The bus 932 can include at least one of a system bus, a memory bus, an address bus, or a message bus, and can permit exchange of information (data, metadata, and/or signaling) between the processor(s) 914, the I/O interface(s) 916, and/or the memory 930, or respective functional elements therein. In certain scenarios, the bus 932 in conjunction with one or more internal programming interfaces 950 (also referred to as interface(s) 950) can permit such exchange of information. In scenarios in which processor(s) 914 include multiple processors, the computing device 910 can utilize parallel computing.

The I/O interface(s) 916 can permit communication of information between the computing device and an external device, such as another computing device, e.g., a network element or an end-user device. Such communication can include direct communication or indirect communication, such as exchange of information between the computing device 910 and the external device via a network or elements thereof. As illustrated, the I/O interface(s) 916 can comprise one or more of network adapter(s) 918, peripheral adapter(s) 922, and rendering unit(s) 926. Such adapter(s) can permit or facilitate connectivity between the external device and one or more of the processor(s) 914 or the memory 930. For example, the peripheral adapter(s) 922 can include a group of ports, which can include at least one of parallel ports, serial ports, Ethernet ports, V.35 ports, or X.21 ports. In certain embodiments, the parallel ports can comprise General Purpose Interface Bus (GPM), IEEE-1284, while the serial ports can include Recommended Standard (RS)-232, V.11, Universal Serial Bus (USB), FireWire or IEEE-1394.

In one aspect, at least one of the network adapter(s) 918 can functionally couple the computing device 910 to one or more computing devices 970 via one or more traffic and signaling pipes 960 that can permit or facilitate exchange of traffic 962 and signaling 964 between the computing device 910 and the one or more computing devices 970. Such network coupling provided at least in part by the at least one of the network adapter(s) 918 can be implemented in a wired environment, a wireless environment, or both. The information that is communicated by the at least one of the network adapter(s) 918 can result from the implementation of one or more operations of a method in accordance with aspects of this disclosure. Such output can be any form of visual representation, including, but not limited to, textual, graphical, animation, audio, tactile, and the like. In certain scenarios, each of the computing device(s) 970 can have substantially the same architecture as the computing device 910. In addition or in the alternative, the rendering unit(s) 926 can include functional elements (e.g., lights, such as light-emitting diodes; a display, such as a liquid crystal display (LCD), a plasma monitor, a light emitting diode (LED) monitor, or an electrochromic monitor; combinations thereof; or the like) that can permit control of the operation of the computing device 910, or can permit conveying or revealing the operational conditions of the computing device 910.

In one aspect, the bus 932 represents one or more of several possible types of bus structures, including a memory bus or a memory controller, a peripheral bus, an accelerated graphics port, and a processor or local bus using any of a variety of bus architectures. As an illustration, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, a Peripheral Component Interconnects (PCI) bus, a PCI-Express bus, a Personal Computer Memory Card International Association (PCMCIA) bus, a Universal Serial Bus (USB), and the like. The bus 932, and all buses described herein can be implemented over a wired or wireless network connection and each of the subsystems, including the processor(s) 914, the memory 930 and memory elements therein, and the I/O interface(s) 916 can be contained within one or more remote computing devices 970 at physically separate locations, connected through buses of this form, in effect implementing a fully distributed system. In certain embodiments, such a distributed system can implement the functionality described herein in a client-host or client-server configuration in which the directed content recommendation component(s) 936 or the directed content recommendation information 940, or both, can be distributed between the computing device 910 and at least one of the computing device(s) 970, and the computing device 910 and at least one of the computing device(s) 970 can execute such components and/or leverage such information.

The computing device 910 can comprise a variety of computer-readable media. Computer-readable media can be any available media (transitory and non-transitory) that can be accessed by a computing device. In one aspect, computer-readable media can comprise computer non-transitory storage media (or computer-readable non-transitory storage media) and communications media. Example computer-readable non-transitory storage media can be any available media that can be accessed by the computing device 910, and can comprise, for example, both volatile and non-volatile media, and removable and/or non-removable media. In one aspect, the memory 930 can comprise computer-readable media in the form of volatile memory, such as random access memory (RAM), and/or non-volatile memory, such as read-only memory (ROM).

The memory 930 can comprise functionality instructions storage 934 and functionality information storage 938. The functionality instructions storage 934 can comprise computer-accessible instructions that, in response to execution (by at least one of the processor(s) 914), can implement one or more of the functionalities of the disclosure. The computer-accessible instructions can embody or can comprise one or more software components illustrated as directed content recommendation component(s) 936. In one scenario, execution of at least one component of the directed content recommendation component(s) 936 can implement one or more of the methods described herein, such as the example method 500, the example method 600, or the example method 800, or both. For instance, such execution can cause a processor (e.g., one of the processor(s) 914) that executes the at least one component to carry out one or a combination of the disclosed example methods. It should be appreciated that, in one aspect, a processor of the processor(s) 914 that executes at least one of the directed content recommendation component(s) 936 can retrieve information from or retain information in one or more memory elements 940 in the functionality information storage 938 in order to operate in accordance with the functionality programmed or otherwise configured by the directed content recommendation component(s) 936. The one or more memory elements 940 may be referred to as directed content recommendation information 940. Such information can include at least one of code instructions, information structures, or the like. For instance, at least a portion of such information structures can be indicative of a mapping or categorization of communication session and virtual locations; access rules; and/or preferences for promotional content.

In some embodiments, one or more components of the directed content recommendation component(s) 936 can embody, or can be part of, at least one of the configuration unit 110, the optimization unit 140, or the sequence generator unit 150. As such, the one or more components can operate in accordance with, and can provide the functionality of, the configuration unit 110, the optimization unit 140, or the sequence generator unit 150 in accordance with aspects described in this disclosure. In other embodiments, one or more of the directed content recommendation component(s) 936 in combination with at least one of the processor(s) 914 can embody or can constitute at least one of the configuration unit 110, the optimization unit 140, or the sequence generator unit 150, and can operate in accordance with, and can provide the functionality of, such units in accordance with aspects described in this disclosure.

At least one of the one or more interfaces 950 (e.g., application programming interface(s)) can permit or facilitate communication of information between two or more components within the functionality instructions storage 934. The information that is communicated by the at least one interface can result from implementation of one or more operations in a method of the disclosure. In certain embodiments, one or more of the functionality instructions storage 934 and the functionality information storage 938 can be embodied in or can comprise removable/non-removable, and/or volatile/non-volatile computer storage media.

At least a portion of at least one of directed content recommendation component(s) 936 or directed content recommendation information 940 can program or otherwise configure one or more of the processors 914 to operate at least in accordance with the functionality described herein. One or more of the processor(s) 914 can execute at least one of the directed content recommendation component(s) 936 and leverage at least a portion of the information in the functionality information storage 938 in order to provide recommendations for digital content for a sequence of multiple pages, in accordance with one or more aspects described herein.

It should be appreciated that, in certain scenarios, the functionality instruction(s) storage 934 can embody or can comprise a computer-readable non-transitory storage medium having computer-accessible instructions that, in response to execution, cause at least one processor (e.g., one or more of the processor(s) 914) to perform a group of operations comprising the operations or blocks described in connection with the disclosed methods.

In addition, the memory 930 can comprise computer-accessible instructions and information (e.g., data, metadata, and/or programming code instructions) that permit or facilitate the operation and/or administration (e.g., upgrades, software installation, any other configuration, or the like) of the computing device 910. Accordingly, as illustrated, the memory 930 can comprise a memory element 942 (labeled operating system (OS) instruction(s) 942) that contains one or more program modules that embody or include one or more operating systems, such as Windows operating system, Unix, Linux, Symbian, Android, Chromium, and substantially any OS suitable for mobile computing devices or tethered computing devices. In one aspect, the operational and/or architectural complexity of the computing device 910 can dictate a suitable OS. The memory 930 also comprises system information storage 946 having data, metadata, and/or programming code that permits or facilitates the operation and/or administration of the computing device 910. Elements of the OS instruction(s) 942 and the system information storage 946 can be accessible or can be operated on by at least one of the processor(s) 914.

It should be recognized that while the functionality instructions storage 934 and other executable program components, such as the OS instruction(s) 942, are illustrated herein as discrete blocks, such software components can reside at various times in different memory components of the computing device 910, and can be executed by at least one of the processor(s) 914. In certain scenarios, an implementation of the directed content recommendation component(s) 936 can be retained on or transmitted across some form of computer-readable media.

The computing device 910 and/or one of the computing device(s) 970 can include a power supply (not shown), which can power up components or functional elements within such devices. The power supply can be a rechargeable power supply, e.g., a rechargeable battery, and it can include one or more transformers to achieve a power level suitable for the operation of the computing device 910 and/or one of the computing device(s) 970, and components, functional elements, and related circuitry therein. In certain scenarios, the power supply can be attached to a conventional power grid to recharge and ensure that such devices can be operational. In one aspect, the power supply can include an I/O interface (e.g., one of the network adapter(s) 918) to connect operationally to the conventional power grid. In another aspect, the power supply can include an energy conversion component, such as a solar panel, to provide additional or alternative power resources or autonomy for the computing device 910 and/or one of the computing device(s) 970.

The computing device 910 can operate in a networked environment by utilizing connections to one or more remote computing devices 970. As an illustration, a remote computing device can be a personal computer, a portable computer, a server, a router, a network computer, a peer device or other common network node, and so on. As described herein, connections (physical and/or logical) between the computing device 910 and a computing device of the one or more remote computing devices 970 can be made via one or more traffic and signaling pipes 960, which can comprise wired link(s) and/or wireless link(s) and several network elements (such as routers or switches, concentrators, servers, and the like) that form a personal area network (PAN), a local area network (LAN), a metropolitan area network (MAN), a wide area network (WAN), and/or other networks (wireless or wired) having different footprints. Such networking environments can be configured in dwellings, offices, enterprise-wide computer networks, intranets, local area networks, and wide area networks.

In one or more embodiments, one or more of the disclosed methods can be practiced in distributed computing environments, such as grid-based environments, where tasks can be performed by remote processing devices (computing device(s) 970) that are functionally coupled (e.g., communicatively linked or otherwise coupled) through a network having traffic and signaling pipes and related network elements. In a distributed computing environment, in one aspect, one or more software components (such as program modules) can be located in both a local computing device 910 and at least one remote computing device.

The disclosed operational environments (e.g., system(s), device(s), etc.) and methods may take the form of an entirely hardware embodiment, an entirely software embodiment, or an embodiment combining hardware and software features. Furthermore, the methods and systems may take the form of a computer program product on a computer-readable non-transitory storage medium having computer-accessible instructions (e.g., computer-readable and/or computer-executable instructions), such as computer software, embodied in the computer-readable non-transitory storage medium. Any suitable computer non-transitory storage medium may be utilized to form the computer program product.

Embodiments of the operational environments and methods are described herein with reference to block diagrams and flowchart illustrations of methods, systems, apparatuses and computer program products. It can be understood that each block of the block diagrams and flowchart illustrations, and combinations of blocks in the block diagrams and flowchart illustrations, respectively, can be implemented by computer-accessible instructions. In certain implementations, the computer-accessible instructions may be loaded or otherwise incorporated into a general-purpose computer, special purpose computer, or other programmable information processing apparatus to produce a particular machine, such that the operations or functions specified in the flowchart block or blocks can be implemented in response to execution at the computer or processing apparatus.

Unless otherwise expressly stated, it is in no way intended that any protocol, procedure, process, or method set forth herein be construed as requiring that its acts or steps be performed in a specific order. Accordingly, where a process or method claim does not actually recite an order to be followed by its acts or steps or it is not otherwise specifically recited in the claims or descriptions of the subject disclosure that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification or annexed drawings, or the like.

As used in this application, the terms "component," "environment," "system," "architecture," "platform," "interface," "unit," "module," and the like are intended to refer to a computer-related entity or an entity related to an operational apparatus with one or more specific functionalities. Such entities may be either hardware, a combination of hardware and software, software, or software in execution. As an example, a component may be, but is not limited to being, a process running on a processor, a processor, an object, an executable portion of software, a thread of execution, a program, and/or a computing device. For example, both a software application executing on a computing device and the computing device can be a component. One or more components may reside within a process and/or thread of execution. A component may be localized on one computing device or distributed between two or more computing devices. As described herein, a component can execute from various computer-readable non-transitory media having various data structures stored thereon. Components can communicate via local and/or remote processes in accordance, for example, with a signal (either analogic or digital) having one or more data packets (e.g., data from one component interacting with another component in a local system, distributed system, and/or across a network such as a wide area network with other systems via the signal). As another example, a component can be an apparatus with specific functionality provided by mechanical parts operated by electric or electronic circuitry that is controlled by a software application or firmware application executed by a processor, wherein the processor can be internal or external to the apparatus and can execute at least a part of the software or firmware application. As yet another example, a component can be an apparatus that provides specific functionality through electronic components without mechanical parts, the electronic components can include a processor therein to execute software or firmware that confers at least in part the functionality of the electronic components. An interface can include input/output (I/O) components as well as associated processor, application, and/or other programming components. The terms "component," "environment," "system," "architecture," "platform," "interface," "unit,"

"module" can be utilized interchangeably and can be referred to collectively as functional elements.

In the present specification and annexed drawings, reference to a "processor" is made. As utilized herein, a processor can refer to any computing processing unit or device comprising single-core processors; single-processors with software multithread execution capability; multi-core processors; multi-core processors with software multithread execution capability; multi-core processors with hardware multithread technology; parallel platforms; and parallel platforms with distributed shared memory. A processor can constitute a central processing unit (CPU), a graphics processing unit (GPU), or a tensor processing unit (TPU). Additionally, a processor can refer to an integrated circuit (IC), an application-specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. A processor can be implemented as a combination of computing processing units. In certain embodiments, processors can utilize nanoscale architectures such as, but not limited to, molecular and quantum-dot based transistors, switches and gates, in order to optimize space usage or enhance performance of user equipment.

In addition, in the present specification and annexed drawings, terms such as "store," "storage," "data store," "data storage," "memory," "repository," and substantially any other information storage component relevant to operation and functionality of a component of the disclosure, refer to "memory components," entities embodied in a "memory," or components forming the memory. It can be appreciated that the memory components or memories described herein embody or comprise non-transitory computer storage media that can be readable or otherwise accessible by a computing device. Such media can be implemented in any methods or technology for storage of information such as computer-readable instructions, information structures, program modules, or other information objects. The memory components or memories can be either volatile memory or non-volatile memory, or can include both volatile and non-volatile memory. In addition, the memory components or memories can be removable or non-removable, and/or internal or external to a computing device or component. Example of various types of non-transitory storage media can comprise hard-disc drives, zip drives, CD-ROM, digital versatile disks (DVD) or other optical storage, magnetic cassettes, magnetic tape, magnetic disk storage or other magnetic storage devices, flash memory cards or other types of memory cards, cartridges, or any other non-transitory medium suitable to retain the desired information and which can be accessed by a computing device.

As an illustration, non-volatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAIVI), and direct Rambus RAM (DRRAM). The disclosed memory components or memories of operational environments described herein are intended to comprise one or more of these and/or any other suitable types of memory.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language generally is not intended to imply that features, elements, and/or operations are in any way required for one or more implementations or that one or more implementations necessarily include logic for deciding, with or without user input or prompting, whether these features, elements, and/or operations are included or are to be performed in any particular implementation.

CONCLUSION

What has been described herein in the present specification and annexed drawings includes examples of systems, devices, and techniques for the generation of an optimal policy for bidding in an auction. The disclosed technologies permit generation of recommendations for digital content to be presented in a sequence of multiple pages (webpages, graphical user interfaces, or similar). It is, of course, not possible to describe every conceivable combination of elements and/or methods for purposes of describing the various features of this disclosure, but it can be recognize that many further combinations and permutations of the disclosed features are possible. Accordingly, it may be apparent that various modifications can be made to the disclosure without departing from the scope or spirit thereof. In addition, or in the alternative, other embodiments of the disclosure may be apparent from consideration of the specification and annexed drawings, and practice of the disclosure as presented herein. It is intended that the examples put forward in the specification and annexed drawings be considered, in all respects, as illustrative and not restrictive. Although specific terms are employed herein, they are used in a generic and descriptive sense only and not for purposes of limitation.

What is claimed is:

1. A method, comprising:
    configuring, by a computing system comprising at least one processor, a first multi-armed bandit (MAB) model defining candidate directed contents for a first webpage in a sequence of webpages, each arm in the first MAB model corresponds to a candidate impression on the first webpage, and wherein the sequence of webpages corresponds to a cancellation process for a membership to a web-based service;
    configuring, by the computing system, a second multi-armed bandit (MAB) model defining candidate directed contents for a second webpage in the sequence of webpages, wherein each arm in the second MAB model corresponds to a candidate impression on the second webpage, and wherein the second webpage is presented after the first webpage;
    configuring, by the computing system, a third multi-armed bandit (MAB) model defining candidate directed contents for a third webpage in the sequence of webpages, wherein each arm in the third MAB model corresponds to a candidate impression on the third webpage, and wherein the third webpage is presented after the second webpage;
    determining, by the computing system, a solution to an optimization problem with respect to an objective function based on an expected long-term reward for a defined impression on the first webpage, a defined impression on the second webpage, and a defined impression on the third webpage, wherein the solution results in first directed content for presentation on the first webpage, second directed content for presentation on the second webpage, and third directed content for presentation on the third webpage;

generating, by the computing system, the sequence of webpages using the first directed content, the second directed content, and the third directed content;

determining, by the computing system, that the process for cancellation is initiated; and causing, by the computing system, a computing device to present sequentially one or more of the first webpage, the second webpage, or the third webpage.

2. The method of claim 1, wherein the second MAB model comprises an identifier of a first arm in the first MAB model as a feature, and wherein the third MAB model comprises an identifier of a first arm in the second MAB model as a feature.

3. The method of claim 1, wherein the determining the solution comprises determining a maximum of the expected long-term reward over a space of directed content impressions spanning the candidate directed contents for the first webpage, the candidate directed contents for the second webpage, and the candidate directed contents for the third webpage.

4. The method of claim 3, wherein the determining the maximum of the expected long-term reward comprises,
determining a maximum of a second expected short-term reward for a second defined impression for the first webpage over a space of directed content impressions spanning the candidate directed contents for the first page;
determining a maximum of a third expected short-term reward for a second defined impression for the second webpage over a space of impressions spanning the candidate directed contents for the second webpage and the second defined impression for the first webpage; and
determining a maximum of a fourth expected short-term reward for a second defined impression for the third webpage over a space of directed content impressions spanning the candidate directed contents for the third page and the second defined impression for the second webpage.

5. The method of claim 3, wherein the determining the maximum of the expectation value comprises determining a maximum, over the space of directed content impressions, of a superposition of a first success rate of terminating the cancellation process at the first webpage, a second success rate of terminating the cancellation process at the second webpage after presentation of the first webpage, and a third success rate of terminating the cancellation process at the third webpage after presentation of the first webpage and the second webpage.

6. A method, comprising:
configuring, by a computing system comprising at least one processor, multiple multi-armed bandit (MAB) models defining candidate directed contents for a sequence of pages, wherein a first MAB model of the multiple MAB models defines candidate directed contents for a first page in the sequence of pages, each arm in the first MAB model corresponds to a candidate impression on the first page, and wherein a second MAB model of the multiple MAB models defines candidate directed contents for a second page in the sequence of pages, each arm in the second MAB model corresponds to a candidate impression on the second page, and further wherein a third MAB model of the multiple MAB models defines candidate directed contents for a third page in the sequence of pages, each arm in the third MAB model corresponds to a candidate impression on the third page;

determining, by the computing system, a solution to an optimization problem with respect to an objective function based on an expected long-term reward for a defined impression on the first page, a defined impression on the second page, and a defined impression on the third page, wherein the solution results in first directed content for presentation on the first page initially, second directed content for presentation on the second page after the first page, and third directed content for presentation on the third page after the second page; and generating, by the computing system, the sequence of pages using the first directed content, the second directed content, and the third directed content, wherein the sequence of pages corresponds to a process of sequential presentation of one or more of the first page, second page and third page to a user designed to attain a defined objective.

7. The method of claim 6, wherein the defined objective has two possible outcomes, a first outcome of the two possible outcomes corresponding to successful attainment of the objective and a second outcome of the two outcomes corresponding to unsuccessful attainment of the objective, and wherein a first page in the sequence of pages comprises a graphical user interface having a first selectable visual element that, in response to being selected, causes termination of the process.

8. The method of claim 6, further comprising:
determining, by the computing system, that the process is initiated; and
causing, by the computing system, a computing device remotely located relative to the computing system to present sequentially one or more of the first page, the second page, or the third page.

9. The method of claim 6, wherein the second MAB model comprises a context element associated with a defined candidate impression in the first MAB model as a feature, and wherein the third MAB model comprises a context element associated with a defined candidate impression in the second MAB model as a feature.

10. The method of claim 6, wherein the determining the solution comprises determining a maximum of the expected long-term reward over a space of directed content impressions spanning candidate directed contents for the first page, candidate directed contents for the second page, and candidate directed contents for the third page.

11. The method of claim 10, wherein the determining the maximum of the expected long-term reward comprises,
determining a maximum of a second expected short-term reward for a second defined impression for the first page over a space of directed content impressions spanning the candidate directed contents for the first page;
determining a maximum of a third expected short-term reward for a second defined impression for the second webpage over a space of impressions spanning the candidate directed contents for the second webpage and the second defined impression for the first webpage; and determining a maximum of a fourth expected short-term reward for a second defined impression for the third webpage over a space of directed content impressions spanning the candidate directed contents for the third page and the second defined impression for the second webpage.

12. The method of claim 10, wherein the determining the maximum of the expected long-term-reward comprises determining a maximum, over the space of directed content impressions, of a superposition of a first success rate of attaining a defined objective at the first page, a second success rate of attaining the defined objective at the second page after presentation of the first page, and a third success rate of attaining the defined objective at the third page after presentation of the first page and the second page, and wherein the defined objective corresponds to a process that includes presenting sequentially one or more of the first page, the second page or the third page.

13. The method of claim 12, wherein the maximum of the superposition comprises applying a sequential Thompson sampling for the first page, the second page, and the third page, wherein the sequential Thompson sampling includes,
determining respective optimal impressions for the first page, the second page, and the third page by solving a second optimization problem with respect to an objective function based on an expected short-term reward;
presenting the sequence of pages having the respective optimal impressions;
evaluating second short-term rewards; and
updating the first MAB model, the second MAB model, and the third MAB model.

14. A computing system, comprising:
at least one processor; and
at least one memory device having computer-executable instructions stored thereon that, in response to execution by the at least one processor, cause the computing system at least to:
configure multiple multi-armed bandit (MAB) models defining candidate directed contents for a sequence of pages, wherein a first MAB model of the multiple MAB models defines candidate directed contents for a first page in the sequence of pages, each arm in the first MAB model corresponds to a candidate impression on the first page, and wherein a second MAB model of the multiple MAB models defines candidate directed contents for a second page in the sequence of pages, each arm in the second MAB model corresponds to a candidate impression on the second page, and further wherein a third MAB model of the multiple MAB models defines candidate directed contents for a third page in the sequence of pages, each arm in the third MAB model corresponds to a candidate impression on the third page;
determine a solution to an optimization problem with respect to an objective function based on an expected long-term reward for a defined impression on the first page, a defined impression on the second page, and a defined impression on the third page, wherein the solution results in first directed content for presentation on the first page initially, second directed content for presentation on the second page after the first page, and third directed content for presentation on the third page after the second page; and
generate the sequence of pages using the first directed content, the second directed content, and the third directed content, wherein the sequence of pages corresponds to a process of sequential presentation of one or more of the first page, second page and third page designed to attain a defined objective.

15. The computing system of claim 14, wherein the defined objective has two possible outcomes, a first outcome of the two possible outcomes corresponding to successful attainment of the objective and a second outcome of the two outcomes corresponding to unsuccessful attainment of the objective, and wherein a first page in the sequence of pages comprises a graphical user interface having a selectable visual element that, in response to being selected, causes termination of the process.

16. The computing system of claim 14, wherein the execution of the instructions further causes the computing system to,
determine that the process is initiated; and
cause a computing device remotely located relative to the computing system to present sequentially one or more of the first page, the second page, or the third page.

17. The computing system of claim 14, wherein the second MAB model comprises a context element of a first arm in the first MAB model as a feature, and wherein the third MAB model comprises a context element of a first arm in the second MAB model as a feature.

18. The computing system of claim 14, wherein determining the solution comprises determining a maximum of the expected long-term reward over a space of directed content impressions spanning candidate directed contents for the first page, candidate directed contents for the second page, and candidate directed contents for the third page.

19. The computing system of claim 18, wherein the determining the maximum of the expected long-term reward comprises,
determining a maximum of a second expected short-term reward for a second defined impression for the first page over a space of directed content impressions spanning the candidate directed contents for the first page;
determining a maximum of a third expected short-term reward for a second defined impression for the second webpage over a space of impressions spanning the candidate directed contents for the second webpage and the second defined impression for the first webpage; and
determining a maximum of a fourth expected short-term reward for a second defined impression for the third webpage over a space of directed content impressions spanning the candidate directed contents for the third page and the second defined impression for the second webpage.

20. The computing system of claim 18, wherein the determining the maximum of the expectation value comprises determining a maximum, over the space of directed content impressions, of a superposition of a first success rate of terminating a process for configuration of a membership to a web-based service at the first page, a second success rate of terminating the process at the second page after presentation of the first page, and a third success rate of terminating the process at the third page after presentation of the first page and the second page.

* * * * *